US009021554B2

(12) United States Patent
Cassidy et al.

(10) Patent No.: US 9,021,554 B2
(45) Date of Patent: *Apr. 28, 2015

(54) UNLIMITED ACCESS TO MEDIA AND APPLICATIONS OVER WIRELESS INFRASTRUCTURE

(75) Inventors: Brendon P. Cassidy, Los Angeles, CA (US); Zack Zalon, Los Angeles, CA (US); John Bolton, Denver, CO (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,334

(22) Filed: Jun. 10, 2011

(65) Prior Publication Data

US 2012/0117620 A1    May 10, 2012

Related U.S. Application Data

(60) Provisional application No. 61/353,606, filed on Jun. 10, 2010, provisional application No. 61/394,209, filed on Oct. 18, 2010, provisional application No. 61/394,222, filed on Oct. 18, 2010, provisional application No. 61/425,192, filed on Dec. 20, 2010, provisional application No. 61/430,086, filed on Jan. 5, 2011.

(51) Int. Cl.
*H04K 1/00* (2006.01)
*H04L 29/06* (2006.01)
(Continued)

(52) U.S. Cl.
CPC .......... *H04L 63/102* (2013.01); *H04N 21/2543* (2013.01); *H04N 21/25866* (2013.01); *H04N 21/47202* (2013.01); *H04W 4/003* (2013.01); *H04L 67/306* (2013.01); *H04W 12/06* (2013.01)

(58) Field of Classification Search
CPC ............ H04W 8/205; G06F 17/30053; G06Q 50/184; G06Q 30/06

USPC .......................................................... 726/3
See application file for complete search history.

(56) References Cited

U.S. PATENT DOCUMENTS 6,813,733 B1    11/2004    Li et al.
6,990,638 B2    1/2006    Barksdale et al.
(Continued)

FOREIGN PATENT DOCUMENTS

JP    2009-053702    3/2009
JP    2009-075987    4/2009
(Continued)

OTHER PUBLICATIONS

U.S. Appl. No. 13/158,287 Notice of Allowance mailed Jul. 29, 2014.
(Continued)

*Primary Examiner* — Kambiz Zand
*Assistant Examiner* — Ghodrat Jamshidi
(74) *Attorney, Agent, or Firm* — Hartman & Citrin LLC

(57) ABSTRACT

Methods, systems, and apparatus are presented for providing unlimited access to either or both of media content, such as music, and applications. A media server environment can be provided, which maintains an instance of each subscriber account, a central archive of media content, and an application catalog. Selected media content can be downloaded to, and stored locally at, a subscriber device, such as on a secure storage device. Also, selected applications can be locally installed on the subscriber device. Access to the local media content and locally installed applications can be controlled through the media server environment based on the status of the subscriber's account. If the subscriber's account becomes inactive, access to the downloaded media content and installed applications can be disabled. Once the subscriber's account is reactivated, access to the downloaded media content and applications can be restored.

24 Claims, 17 Drawing Sheets

(51) Int. Cl.
*H04N 21/2543* (2011.01)
*H04N 21/258* (2011.01)
*H04N 21/472* (2011.01)
*H04W 4/00* (2009.01)
*H04L 29/08* (2006.01)
*H04W 12/06* (2009.01)

(56) References Cited

U.S. PATENT DOCUMENTS

| | | | |
|---|---|---|---|
| 7,216,301 B2 | 5/2007 | Moehrle | |
| 7,466,807 B2 | 12/2008 | McCann et al. | |
| 7,596,761 B2 | 9/2009 | Lemay et al. | |
| 7,706,778 B2* | 4/2010 | Lowe | 455/411 |
| 8,161,411 B2 | 4/2012 | Robbin et al. | |
| 8,171,419 B2 | 5/2012 | Mujkic et al. | |
| 8,254,829 B1 | 8/2012 | Kindred et al. | |
| 8,290,471 B1 | 10/2012 | Jones et al. | |
| 2002/0069037 A1 | 6/2002 | Hendrickson et al. | |
| 2002/0100052 A1 | 7/2002 | Daniels | |
| 2002/0147728 A1 | 10/2002 | Goodman et al. | |
| 2005/0021470 A1 | 1/2005 | Martin et al. | |
| 2005/0073991 A1 | 4/2005 | Roberts et al. | |
| 2005/0132018 A1 | 6/2005 | Milic-Frayling et al. | |
| 2005/0132297 A1 | 6/2005 | Milic-Frayling et al. | |
| 2006/0019632 A1 | 1/2006 | Cunningham et al. | |
| 2006/0101350 A1 | 5/2006 | Scott | |
| 2006/0184897 A1 | 8/2006 | Young Suk Lee | |
| 2006/0280050 A1* | 12/2006 | Miles et al. | 369/30.05 |
| 2006/0288112 A1 | 12/2006 | Soelberg et al. | |
| 2007/0033402 A1 | 2/2007 | Williams et al. | |
| 2007/0100834 A1 | 5/2007 | Landry et al. | |
| 2007/0198746 A1 | 8/2007 | Myllyla et al. | |
| 2008/0004978 A1 | 1/2008 | Rothschild | |
| 2008/0005179 A1 | 1/2008 | Friedman et al. | |
| 2008/0040028 A1 | 2/2008 | Crump | |
| 2008/0059908 A1 | 3/2008 | Arvilommi | |
| 2008/0059909 A1 | 3/2008 | Parada et al. | |
| 2008/0059911 A1 | 3/2008 | Kulo et al. | |
| 2008/0189255 A1 | 8/2008 | Zatloukal et al. | |
| 2008/0194276 A1 | 8/2008 | Lin et al. | |
| 2008/0194296 A1 | 8/2008 | Roundtree | |
| 2009/0017860 A1 | 1/2009 | Cole | |
| 2009/0018898 A1 | 1/2009 | Genen | |
| 2009/0076881 A1 | 3/2009 | Svendsen | |
| 2009/0132453 A1 | 5/2009 | Hangartner et al. | |
| 2009/0157842 A1 | 6/2009 | Shaffer et al. | |
| 2009/0182546 A1 | 7/2009 | Gentric | |
| 2009/0257804 A1* | 10/2009 | Manico et al. | 400/70 |
| 2009/0287841 A1 | 11/2009 | Chapweske et al. | |
| 2009/0307135 A1 | 12/2009 | Gupta et al. | |
| 2010/0022270 A1 | 1/2010 | Mikkelsen et al. | |
| 2010/0031288 A1 | 2/2010 | Scott et al. | |
| 2010/0031366 A1 | 2/2010 | Knight et al. | |
| 2010/0049862 A1 | 2/2010 | Dixon | |
| 2010/0057852 A1 | 3/2010 | Barile | |
| 2010/0082448 A1 | 4/2010 | Lin et al. | |
| 2010/0111278 A1 | 5/2010 | Trimborn et al. | |
| 2010/0113065 A1 | 5/2010 | Narayan et al. | |
| 2010/0169832 A1 | 7/2010 | Chang | |
| 2010/0185776 A1 | 7/2010 | Hosur et al. | |
| 2010/0235476 A1 | 9/2010 | Lin et al. | |
| 2010/0311391 A1* | 12/2010 | Siu et al. | 455/411 |
| 2010/0324977 A1 | 12/2010 | Dragt | |
| 2011/0060764 A1 | 3/2011 | Lourdeaux | |
| 2011/0066633 A1 | 3/2011 | Naftolin et al. | |
| 2011/0082572 A1 | 4/2011 | Ramakrishnan et al. | |
| 2011/0087665 A1 | 4/2011 | Weare | |
| 2011/0087690 A1 | 4/2011 | Cairns | |
| 2011/0093913 A1 | 4/2011 | Wohlert et al. | |
| 2011/0111278 A1 | 5/2011 | Ghosh et al. | |
| 2011/0141887 A1 | 6/2011 | Klein et al. | |
| 2011/0158406 A1 | 6/2011 | Marcia et al. | |
| 2011/0185278 A1 | 7/2011 | Flickinger et al. | |
| 2011/0196953 A1 | 8/2011 | Samaha | |
| 2011/0251995 A1 | 10/2011 | Hangartner et al. | |
| 2011/0304685 A1 | 12/2011 | Khedouri et al. | |
| 2012/0022967 A1 | 1/2012 | Bachman et al. | |
| 2012/0059748 A1 | 3/2012 | Matsuo et al. | |
| 2012/0059910 A1 | 3/2012 | Cassidy et al. | |
| 2012/0088477 A1 | 4/2012 | Cassidy et al. | |
| 2012/0089910 A1 | 4/2012 | Cassidy et al. | |
| 2012/0089951 A1 | 4/2012 | Cassidy et al. | |
| 2012/0096056 A1 | 4/2012 | Thomas | |
| 2012/0109997 A1 | 5/2012 | Sparks et al. | |
| 2012/0110074 A1 | 5/2012 | Getchius | |
| 2012/0117026 A1 | 5/2012 | Cassidy et al. | |
| 2012/0117185 A1 | 5/2012 | Cassidy et al. | |
| 2012/0117197 A1 | 5/2012 | Cassidy et al. | |
| 2012/0117620 A1 | 5/2012 | Cassidy et al. | |
| 2012/0124162 A1 | 5/2012 | Cassidy et al. | |
| 2012/0124177 A1 | 5/2012 | Sparks | |
| 2012/0149338 A1 | 6/2012 | Roundtree | |
| 2012/0203871 A1 | 8/2012 | Svendsen | |
| 2013/0094402 A1 | 4/2013 | Muhamed et al. | |
| 2013/0189942 A1 | 7/2013 | Vendrow et al. | |

FOREIGN PATENT DOCUMENTS

| | | |
|---|---|---|
| KR | 10-2004-0095934 | 11/2004 |
| KR | 10-2006-0129330 | 12/2006 |
| KR | 10-2009-0013259 | 2/2009 |
| WO | WO 2010/128442 A2 | 11/2010 |
| WO | WO 2011/156785 | 12/2011 |

OTHER PUBLICATIONS

U.S. Appl. No. 13/158,321 Office Action mailed Jul. 29, 2014.
U.S. Appl. No. 13/078,865, filed Apr. 1, 2011.
U.S. Appl. No. 13/045,409 Office Action mailed May 23, 2014.
U.S. Appl. No. 13/045,409 Office Action mailed Jan. 2, 2014.
U.S. Appl. No. 13/280,277 Office Action mailed Oct. 15, 2013.
U.S. Appl. No. 13/280,277 Office Action mailed Feb. 14, 2013.
U.S. Appl. No. 13/158,287 Office Action mailed Mar. 28, 2014.
U.S. Appl. No. 13/158,287 Office Action mailed Nov. 6, 2013.
U.S. Appl. No. 13/158,287 Office Action mailed Feb. 21, 2013.
U.S. Appl. No. 13/158,300 Office Action mailed Aug. 30, 2013.
U.S. Appl. No. 13/158,300 Office Action mailed Nov. 28, 2012.
U.S. Appl. No. 13/158,319 Office Action mailed Jul. 26, 2013.
U.S. Appl. No. 13/158,319 Office Action mailed Jan. 8, 2013.
U.S. Appl. No. 13/158,321 Office Action mailed Jan. 21, 2014.
U.S. Appl. No. 13/158,321 Office Action mailed Jun. 12, 2013.
U.S. Appl. No. 13/158,321 Office Action mailed Oct. 30, 2012.
U.S. Appl. No. 13/158,326 Office Action mailed Feb. 26, 2014.
U.S. Appl. No. 13/158,326 Office Action mailed Jul. 3, 2013.
U.S. Appl. No. 13/158,326 Office Action mailed Oct. 25, 2012.
U.S. Appl. No. 13/158,333 Office Action mailed Sep. 24, 2013.
U.S. Appl. No. 13/158,333 Office Action mailed Jan. 7, 2013.
U.S. Appl. No. 13/078,865 Office Action mailed Oct. 15, 2013.
U.S. Appl. No. 13/078,865 Office Acton mailed Jun. 13, 2013.
U.S. Appl. No. 13/158,329 Office Action mailed Jul. 25, 2013.
U.S. Appl. No. 13/158,329 Office Action mailed Nov. 21, 2012.
PCT/US2011/040080 International Search Report dated Feb. 9, 2012.
PCT/US2011/040080 Written Opinion dated Feb. 9, 2012.
EP11793289.7 European Search Opinion and Supplemental European Search Report dated Apr. 4, 2014.
PCT/US2011/040086 International Search Report dated Feb. 9, 2012.
PCT/US2011/040086 Written Opinion dated Jan. 30, 2012.
PCT/US2011/040088 International Search Report dated Feb. 9, 2012.
PCT/US2011/040088 Written Opinion dated Jan. 31, 2012.
Office Action mailed Oct. 21, 2014 in U.S. Appl. No. 13/280,277.
Office Action mailed Sep. 11, 2014 in U.S. Appl. No. 13/078,865.
Office Action mailed Oct. 10, 2014 in U.S. Appl. No. 13/158,319.
Office Action mailed Sep. 25, 2014 in U.S. Appl. No. 13/158,326.

(56) References Cited

OTHER PUBLICATIONS

Office Action mailed Sep. 22, 2014 in U.S. Appl. No. 13/158,329.
Office Action mailed Nov. 3, 2014 in U.S. Appl. No. 13/158,333.
Paul Douglas, "30 Google Chrome tips, tricks and shortcuts," Sep. 12, 2008, TechRadar, available at <http://web.archive.org/web/20080912065612/http://www.techradar.com/news/internet/web/30-goog le-chrome-tips-tricksandshortcuts-462663>.
"The Invisible Browser," Sep. 5, 2008, Google Operating System, available at <http://web.archive.org/web/20080905215028/http://googlesystem.blogspot.com/2008/09/invisiblebrowser.html>.
Office Action mailed Jan. 28, 2015 in U.S. Appl. No. 13/158,300.

* cited by examiner

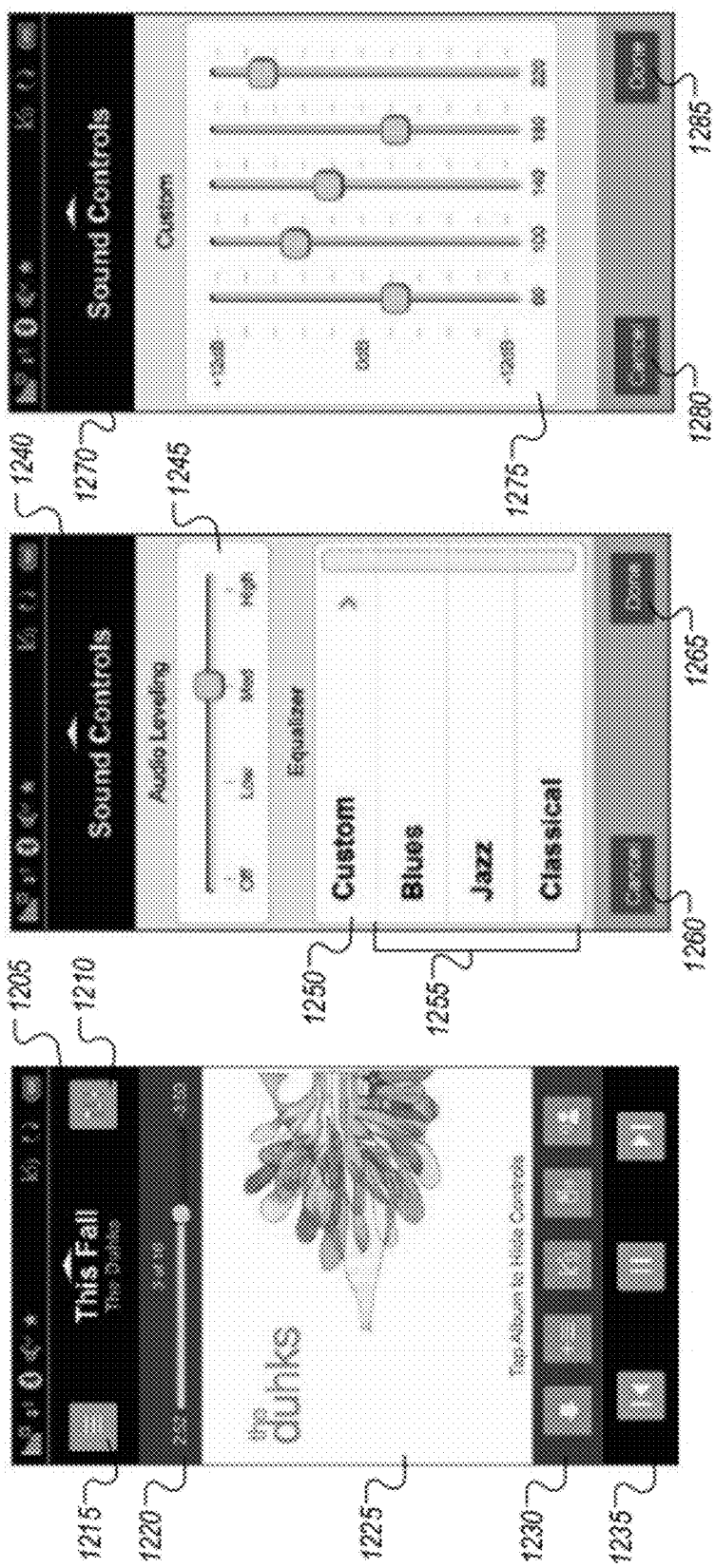

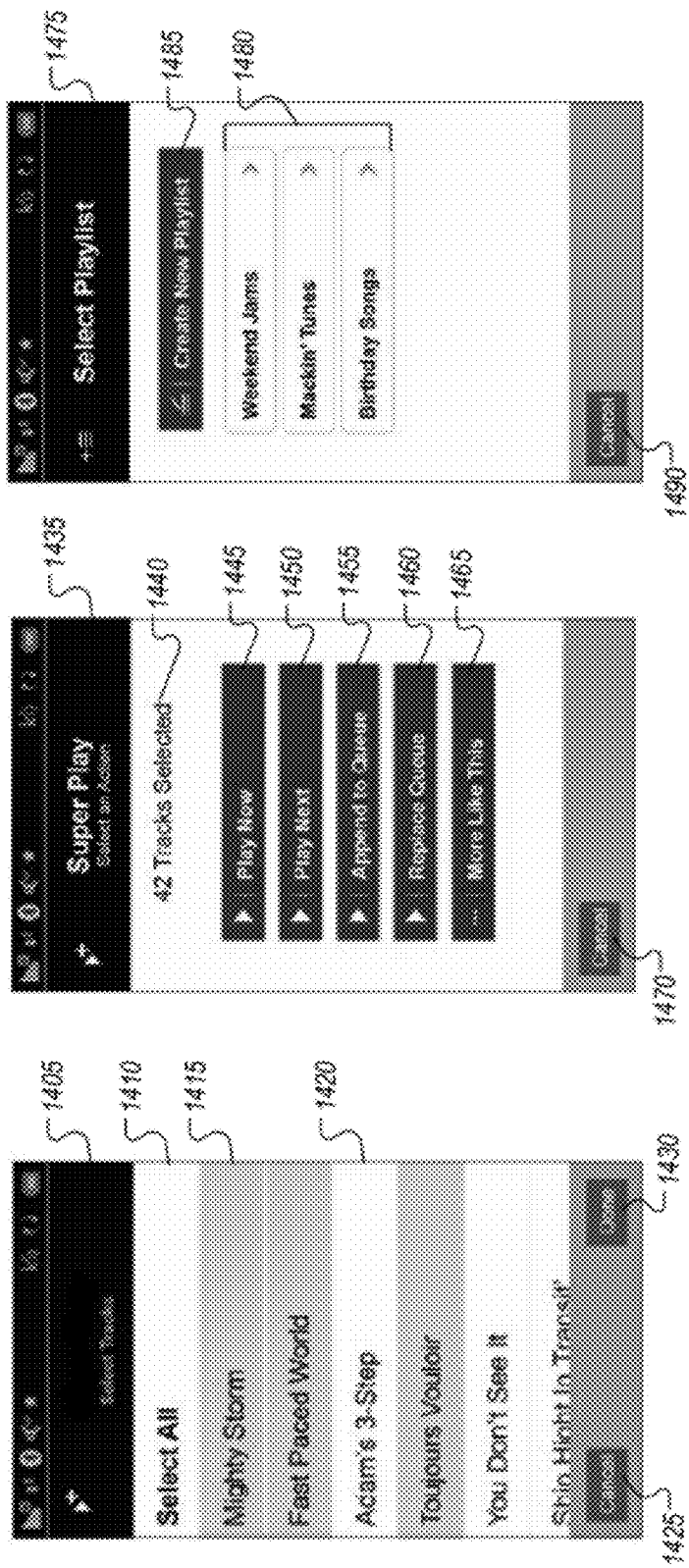

UNLIMITED ACCESS TO MEDIA AND APPLICATIONS OVER WIRELESS INFRASTRUCTURE

This application claims priority under 35 U.S.C. §119(e) to Provisional Patent Application No. 61/353,606 entitled "Unlimited Media Access Over Wireless Infrastructure" filed Jun. 10, 2010, to Provisional Patent Application No. 61/394,209 entitled "Mobile Handset For Media Access And Playback filed Oct. 18, 2010, to Provisional Patent Application No. 61/394,222 entitled "Media Server Providing Unlimited Media Access Over Wireless Infrastructure" filed Oct. 18, 2010, to Provisional Patent Application No. 61/430,086 entitled "Unlimited Access to Media And Applications Over Wireless Infrastructure" filed Jan. 5, 2011, and to Provisional Patent Application No. 61/425,192 entitled "Unlimited Access to Media And Applications Over Wireless Infrastructure" filed Dec. 20, 2010, the contents of all five of which are incorporated herein by reference.

TECHNICAL FIELD

The present disclosure relates to providing unlimited access to applications and media, such as music and ring tones, to wireless devices over wireless infrastructure, and to managing the distribution of applications and media to wireless devices from a centralized server environment.

BACKGROUND

Mobile communications devices have been adapted to a wide variety of applications, including computing, communication, and entertainment. For example, mobile communications devices permit users to freely initiate and receive voice communications, e.g. through dial-up connections or push-to-talk. Further, mobile communications devices have been developed to provide users with access to data communications through wireless connectivity, such as over IEEE 802.11 or 3G/4G networks. Data communications can provide a user with access to a wide variety of entertainment options, including audio, video, and gaming content.

Services have been developed which permit a user to load media content, e.g. music and videos, onto a mobile communications device for subsequent playback. For instance, media content can be purchased from an on-line source, such as in accordance with a pay-per-song model. Purchased media content can be downloaded to a computing device, e.g. a desktop or a laptop. Further, the content can be transferred off-line to a mobile communications device from the computing device, e.g. through a sync (or synchronization) procedure. The media content can then be played back on the mobile communications device using a playback application. Once the media content is no longer desired on the mobile communications device, it can be deleted. Accordingly, media device functionality, e.g. an MP3 player, can be incorporated into a mobile communications device.

Internet radio (or web radio or streaming radio) also has been developed to stream music over a network, such as the internet, to receivers that can play the streamed content. Internet radio typically is implemented similar to traditional broadcast radio in that the streamed content cannot be paused or replayed. Further, channels can be programmed to feature a particular style, type, or genre of content, but cannot be programmed by the listener. Additionally, the streamed content is not persistently stored on the receiver, so play back is possible only when a connection to the streaming source is available.

SUMMARY

A service can be structured to provide a subscriber with unlimited access to and/or unlimited use of either or both of applications and media content. Unlimited access and/or unlimited use can be truly unlimited, such that no restrictions are placed on the amount of media that can be downloaded in a given period, e.g. a month. Alternatively, unlimited access and/or unlimited use can be structured to impose one or more restrictions, such as a limitation based on a number of applications and/or items of media content accessed during a given period or based on network traffic over a given period, e.g., measured in megabytes or gigabytes. The applications can include both stand-alone applications, e.g. that execute locally on a host device, and interactive applications, e.g. that communicate or otherwise interact with one or more resources external to the host device. For example, interactive applications can communicate over a data communications connection provided by a host mobile communications device. Further, interactive applications can be configured to execute in parallel with other mobile communications device functions. For example, an interactive application, e.g. a gaming application, can execute at the same time a user is engaging in a conversation, e.g. over a voice connection provided by the mobile communications device. The applications can be directed to any functionality, including gaming, social-networking, e-commerce, navigation, and travel applications. The media content can include one or more of audio content, e.g. music, and video content, e.g. music videos. Other types of media content, e.g. movies, television programs, and shorts, also can be provided. Additionally, media content structured for use in communications, e.g. ring tones and ring back tones, also can be provided. Further, the unlimited access to either or both of applications and media content can be provided in conjunction with one or more communications services, including one or more of voice communications and data communications. For instance, a single, unlimited-use offering that includes access to applications, media content, and one or more communications services can be provided to mobile communications device subscribers.

The present inventors recognized a need to provide centralized management of media content. The present inventors also recognized a need to provide centralized management of applications, such as mobile applications configured to execute on a mobile device. A collection of servers (referred to as "the cloud") can be configured to maintain an instance of each subscriber account, e.g., an account associated with the subscriber that enables access to the unlimited music service. The instance of a subscriber account can indicate each song that has been downloaded to the corresponding subscriber's mobile communications device. The cloud also can be configured to maintain data corresponding to a subscriber account, such as data indicating the frequency with which songs are played, the most recently played song, songs that have not been played, subscribed play lists, and the frequency with which play lists are accessed. Also, the cloud can be configured to associate with the instance an indication of each application installed on the subscriber's mobile device that was obtained through the cloud. Data corresponding to each such application also can be maintained, including data indicating when an application was installed, how frequently an application is accessed, the last time an application was accessed, and when an application was uninstalled. Further, the cloud can be configured to manage interactions between users, including messaging and introductions between users. The need to provide a central media catalog at the cloud also was recognized. A subscriber can access the central media catalog to select items of media that are to be downloaded. The need to provide a central applications catalog also was recognized, the central applications catalog being configured to permit a subscriber to select one or more applications for installation on a corresponding mobile device.

The present inventors also recognized a need, in an unlimited use model, to allow media content to be stored locally on a mobile communications device. Further, the present inventors recognized the need to store the media content securely, such that digital rights management protections could be enforced. The need to permit removal of the media content storage, such as to provide for expansion and transfer, also was recognized. The present inventors also recognized the need to perform digital rights management, e.g. validation and verification, at the subscriber account level.

The present inventors also recognized the need to configure the system such that all communications, e.g. the requesting and downloading of media and applications, are to be conducted between the mobile communications device and the cloud. However, the need to permit a subscriber account to be managed through an alternative device also was recognized. For instance, one or more account details, including the media to be stored locally at the mobile communications device and applications to be installed on the mobile device, also can be specified through a browser interface from a computing device.

Additionally, the present inventors recognized the need to provide a media application on the mobile communications device, e.g. to perform media management and playback. The need to optionally include one or more dedicated, physical controls on the mobile communications device for interaction with the media application also was recognized. Further, the present inventors recognized the need to permit the media application to communicate with one or more other applications hosted, or otherwise made accessible, by the mobile communications device. For instance, the media application can be configured to access contacts maintained by the mobile communications device.

The techniques described in this specification can be implemented to realize one or more of the following advantages. The techniques can be implemented such that a mobile communications device can store locally an archive of media based on a subscription plan instead of a pay-per-download model. The techniques also can be implemented to permit authorizing a user to access media on the mobile communications device based on having an active subscription. Further, the media archive can be modified as desired without paying additional fees. The techniques also can be implemented to permit automatically altering at least a portion of the media stored on the mobile communications device based on one or more subscribed play lists. For instance, a play list can be altered periodically, e.g. weekly, and music included in the play list that is not presently stored on the mobile communications device can be automatically downloaded.

Techniques also can be implemented to permit displaying all items included in a collection of media, such as tracks associated with an album, and to indicate which items are stored locally and which are stored remotely. Also, the techniques can be implemented to permit specifying one or more of the remotely stored items to be downloaded. Further, the techniques can be implemented such that media items to be downloaded can be prioritized, e.g. based on an indicated preference for immediate access. The techniques also can be implemented such that a local media archive can include multiple storage devices, e.g. media cards. Additionally, the techniques can be implemented such that a physical storage device housing at least part of a media archive can be accessed by another subscribing user.

The techniques also can be implemented to permit selecting, by a subscriber, one or more applications from a central applications catalog (or library) for installation on a subscriber mobile device and permitting the subscriber to access installed applications as long as an active subscription including applications is maintained. Further, the techniques can be implemented to permit verifying that a subscriber has an active subscription before providing access to one or more locally installed applications obtained through the central applications catalog. The verification can be performed in real-time, e.g. as an application is initialized, or in non-real-time, e.g. based on a token that is provided periodically, an expiration date, or other such validation mechanism.

The details of one or more implementations are set forth in the accompanying drawings and the description below. Other features and advantages will be apparent from the description and drawings, and from the claims.

BRIEF DESCRIPTION OF THE DRAWINGS

FIGS. 12A-12C show exemplary interfaces for controlling the playback of media in the unlimited media system.

FIGS. 14A-C show exemplary interfaces for selecting and operating on media in the unlimited media system.

Like reference symbols indicate like elements throughout the specification and drawings. Additional descriptions also are provided in the attached appendix.

DETAILED DESCRIPTION

Figure 1:
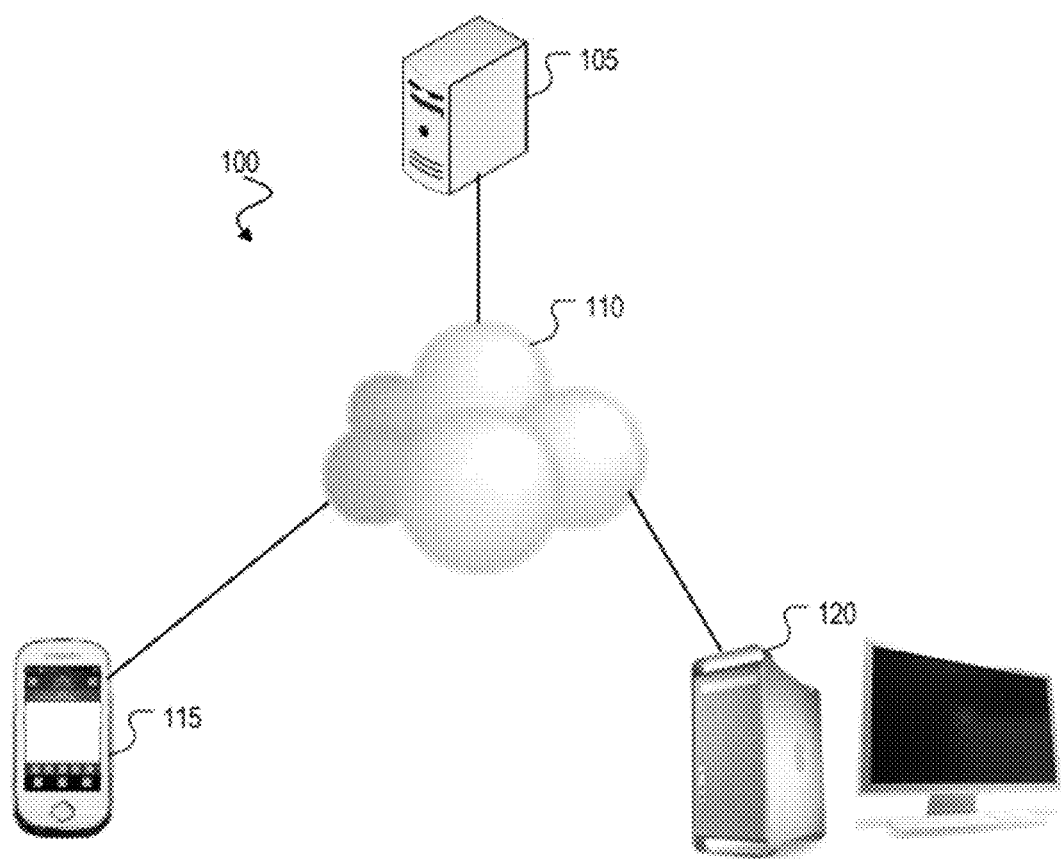
FIG. 1 shows an exemplary computing environment in which unlimited access to media can be provided to a subscribing user.

FIG. 1 shows an exemplary computing environment in which unlimited access to either or both of applications and media can be provided to a subscribing user. Computing environment 100 can include a server 105 (the cloud) configured to provide access to and management of applications and/or media content. Server 105 can be implemented using a single computing device or multiple computing devices, which can be co-located or distributed across two or more locations. For instance, in some implementations, server 105 can be implemented using one or more application servers, web servers, and data servers.

Server 105 can host one or more applications configured to manage subscribing users. For instance, server 105 can be configured to validate a user before the user is authorized to perform application and/or media related functions, including accessing locally stored media, locally installed applications, installing applications, and downloading media from server 105. Further, server 105 can maintain an instance of one or more user accounts, including user account details, e.g. mobile identification number and subscriber name, locally stored music, subscribed play lists, managed play lists, play back history, installed applications, application usage data, and contacts. Server 105 also can host a media catalog, which can be accessed by subscribing users to select media for download. Server 105 further can host an application catalog, which can be accessed by subscribing users to select applications for installation. The installation can be performed over-the-air from a server, e.g. server 105, or through downloading one or more files over-the-air to the subscriber device for local installation. Additionally, server 105 can be configured to manage the transfer of music to one or more subscribing users, including the transfer of media requested by a particular user and the automated transfer of music associated with subscribed play lists.

Server 105 can be adapted to communicate with subscribing users over a network 110, which can be implemented using one or more data networks. For instance, network 110 can include either of both of wired and wireless communication links. Further, network 110 can be a public network, e.g. the internet, a private network, e.g. a cellular data network, or a combination thereof. Network 110 also can include one or more gateways, which facilitate the transfer of data between devices using different protocols. Network 110 also can include either or both of secure links and unsecure links. Additionally, network 110 can include network infrastructure provided by multiple parties, such as a host network and one or more partner networks, e.g. roaming partners.

One or more mobile communications devices 115 associated with subscribing users also can be configured to communicate over network 110, e.g. with server 105 and other mobile communications devices 115. Any number of mobile communications devices 115 can be included in computing environment 100. As the number of mobile communications devices 115 increases, server 105 and network 110 can be scaled, e.g. by adding additional resources, to provide an acceptable level of service. A mobile communications device 115 can be any mobile device configured to communicate over the network 110 with a host service provider, e.g. server 105. For instance, a mobile communications device 115 can be a mobile telephone that is adapted to transmit and receive data communications, e.g., a smart phone.

A mobile communications device 115 further can include a data storage device configured to receive and store media content. The data storage device can be adapted to provide secure storage for the media content, as well as to perform digital rights management functions, e.g. decrypting media content for playback on the mobile communications device 115. In some implementations, the data storage device can be a removable device, e.g. a flash memory module. Thus, a local media library can be stored across multiple data storage devices, which can be swapped to provide access to different portions of the library. The mobile communications device 115 also can include an application data storage device configured to store application files for locally installed applications. The application data storage device can be the same as or different from the data storage device configured to stored media content.

A mobile communications device 115 also can include a display, e.g. a liquid crystal display (LCD) or a light emitting diode (LED) display, and one or more user input devices, such as a touch screen, a touch pad, one or more buttons, one or more keys, a scroll wheel, a dial, a switch, a microphone, or any other such input device. Further, a mobile communications device 115 can be adapted to communicate using one or more protocols, such as 3G, Wi-Fi, or other such protocols. For instance, a mobile communications device 115 can be configured to communicate over Wi-Fi when possible and otherwise to use a 3G connection.

Additionally, computing environment 100 can include one or more computing systems 120. A computing system 120 can be implemented using a computing device, such as a desktop computer, a laptop computer, a net book, a tablet computing device, a workstation, and a server. Computing system 120 also can be configured to transmit and receive data over network 110, e.g. over a TCP/IP connection. Thus, computing system 120 can be adapted to provide data communications with server 105. For instance, computing system 120 can be used to perform functions relating to a subscribing user's account, such as account management and the selection of media.

Figure 2:
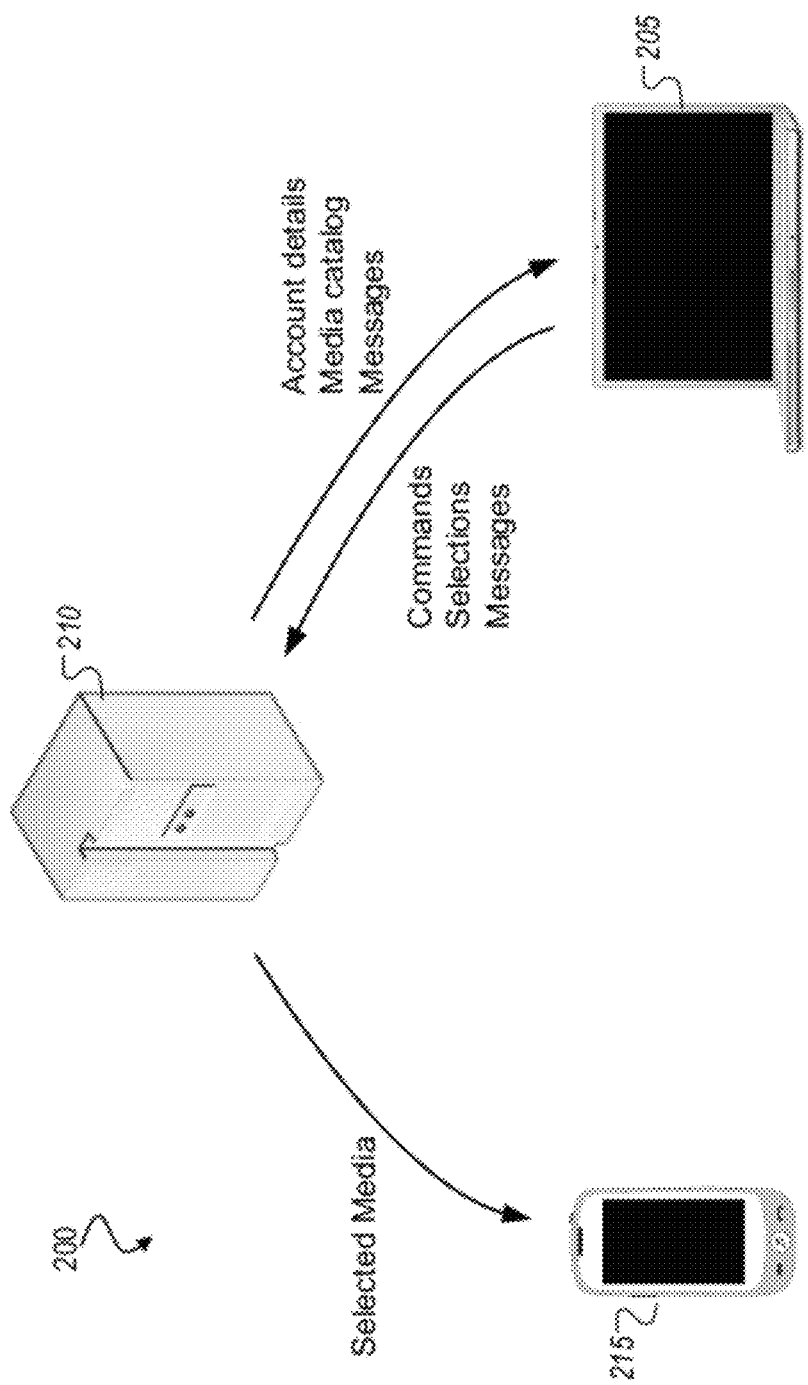
FIG. 2 shows an exemplary data flow between a mobile communications device, a computing device, and a server.

FIG. 2 shows an exemplary data flow between a mobile communications device, a computing device, and a server. Computing environment 200 can include a computing device 205, a server 210, and a mobile communications device 215. Computing device 205 can be implemented using any computer, including a desktop computer, a laptop computer, a net book, a tablet computer, a workstation, and a server. Further, server 210 can be implemented using one or more servers, e.g. as a combination of servers forming a virtual server, including one or more application servers, data servers, and web servers. Additionally, mobile communications device 215 can be any communication device configured to provide data communications, e.g. a smart phone or web-enabled phone.

Server 210 can communicate separately with both computing device 205 and mobile communications device 215. For instance, server 210 can communicate with computing device 205 over a public network, e.g. the internet, a private network, e.g. a local area network (LAN), or a combination thereof. Further, server 210 can communicate with mobile communications device 215 over a network that includes a wireless data network link, e.g. to a 3G or 4G network. Further, computing device 205 can communicate with mobile communications device 215 via a communications network, e.g., via a Wi-Fi or a 3G or 4G network. In some implementations, computing device 205 and mobile communications device 215 can be configured such that they do not communicate directly with each other.

Computing device 205 can communicate with server 210 to perform operations relating to one or more hosted media applications. For instance, computing device 205 can perform account management functions, messaging, and play list management. Server 210 can provide one or more interfaces to computing device 205. In some implementations, the one or more interfaces can be formatted for a larger display and thus can include additional information. Additionally, the one or more interfaces can be presented without installing an application or plug-in, e.g. as web pages presented in a browser. The interfaces can be compatible with multiple browsers, such that subscriber management from the computing device 205 can be platform independent. Computing device 205 also can communicate with server 210 to request the installation of one or more applications available from the server 210 on a mobile communications device 215. Installation of the application can be performed over-the-air between the server 210 and the mobile communications device 215 without further involvement of the computing device 205.

The interfaces provided by server 210 can enable access to account details relating to a subscribing user, e.g. address and subscription information. Further, server 210 can provide access to at least a portion of a media collection, including one or more play lists. Items of media content can be selected from the media collection for download. Also, play lists can be managed, including generating play lists, modifying play lists, deleting play lists, subscribing to play lists and unsubscribing from play lists. Additionally, server 210 can provide access to messaging associated with a media application, including the ability to read messages that have been received and to generate new messages.

Server 210 further can be configured to transfer media content selected through computing device 205 directly to mobile communications device 215. For instance, a user can browse the media collection provided by server 210 through an interface provided by computing device 205, and can select one or more items of media content, e.g. songs, for download. The items of media content selected for download can be transferred, e.g. through an over-the-air download, directly to mobile communications device 215. As a result, mobile communications device 215 need not be synchronized with, or otherwise communicate with, computing device 205. Also, media content need not be downloaded to or stored on computing device 205. Thus, shared computing devices, e.g. library or school computers, can be used to perform account management and media management functions.

Figure 3:
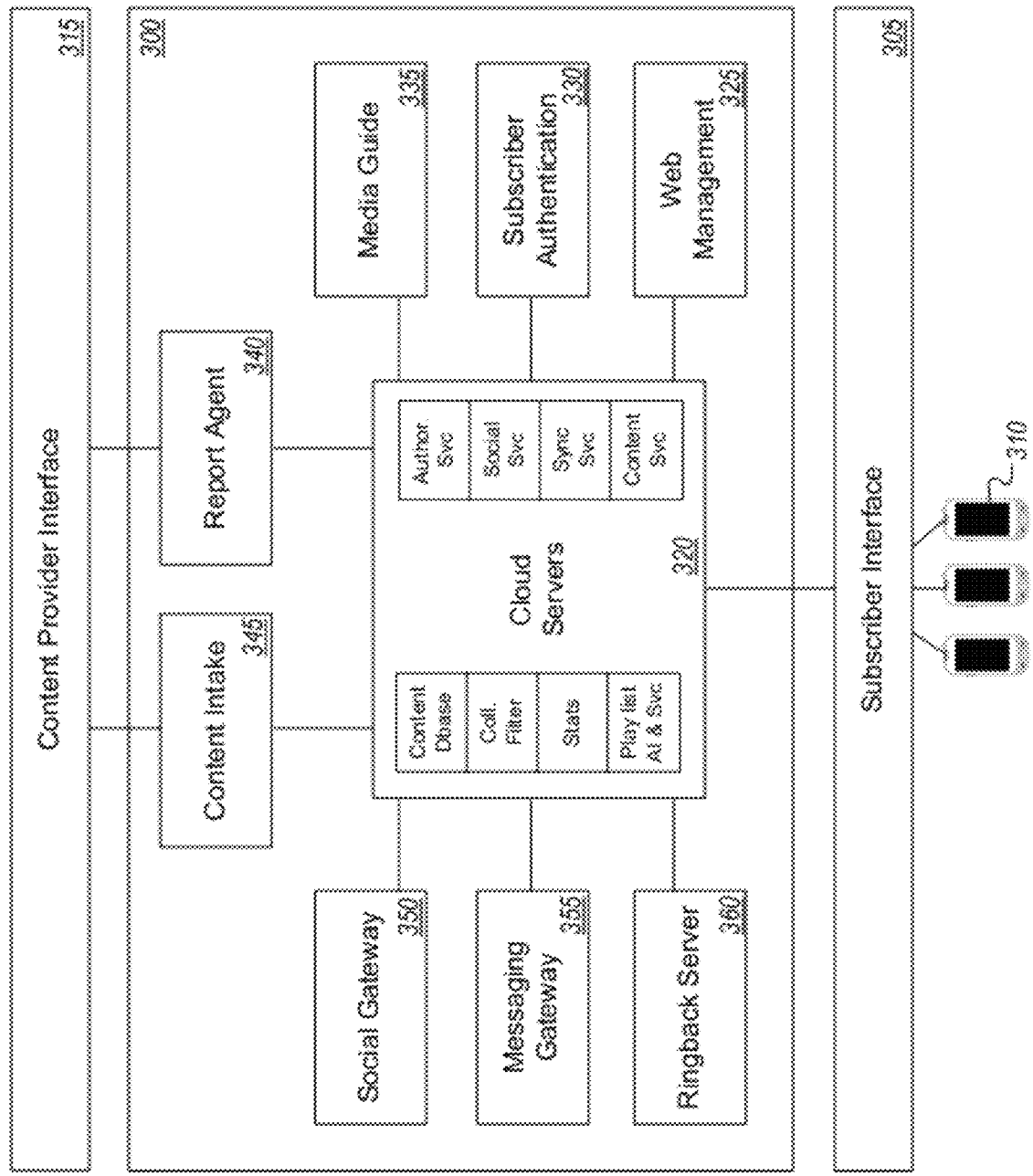
FIG. 3 shows an exemplary server configuration for providing unlimited access to media content.

FIG. 3 shows an exemplary server configuration for providing unlimited access to media content. A media server environment 300 can be implemented using a collection of servers, e.g. configured to provide the appearance of a single device. The collection of servers can be scaled to correspond to demand. The collection of servers can include one or more core servers 320 (or "the cloud") configured to provide services relating to the provision of media content. Additionally, the collection of servers can include one or more secondary servers, e.g. web management server 325, configured to provide additional functionality. In some other implementations, all of the functionality of media server environment 300 can be resident in the core servers 320. The servers included in media server environment 300 can be co-located or distributed, and can communicate over dedicated connections and/or networked connections, including public and private networks.

Media server environment 300 can be accessible to subscribers 310 through a subscriber interface 305, which can enable communication between subscriber devices, e.g. mobile communications devices, and the collection of servers. For instance, subscriber interface 305 can include a gateway adapted to format communications transmitted and received by the media server environment 300. Media server environment 300 also can include a content provider interface 315 configured to provide access to one or more content providers. For instance, content provider interface 315 can permit media content providers, e.g. record label companies, to transfer media content into media server environment 300, such as through content intake server 345. Further, content provider interface 315 can permit content providers to receive reports, e.g. relating to media download activity, from media server environment 300. The subscriber interface 305 and content provider interface 315 also can be configured to provide security to control access to media server environment 300 and encryption/decryption of messages transmitted and received by the collection of servers. Additionally, a web management server 325 can be configured to provide user interfaces through which the functions provided by the media server environment 300 can be accessed.

Core servers 320 (or "Cloud" or "the Cloud") can provide access to media content for subscribers 310. For instance, core servers 320 can include a content database that includes the media content available for download by subscribers. The media content can include any or all of music, ring tones, ringback tones, music videos, television programs, movies, and video shorts. Further, the media content can be encoded in one or more supported formats, such as when the media content is loaded into the media server environment 300. For instance, music can be encoded in a format that can support progressive playback, high-quality encoding, metadata support, robust error management, and compression, e.g. Dolby® Pulse. In some implementations, the media content can be received from a content provider in any format and converted to an internal format, e.g. Dolby® Pulse, by the content intake server 345.

The core servers 320 also can provide content related services. Browsing and searching functionality can be provided to permit subscribers to explore one or more portions of the media collection. For instance, a subscriber can search a music catalog based on one or more criteria, e.g. artist, album, song, or genre, or can browse a music catalog to select content. A media guide 335 can be configured to assist with browsing and searching functions, such as by identifying and classifying media included in the media catalog. Play list services also can be provided by the core servers 320. For instance, one or more preconfigured play lists, e.g. top 20 downloads, can be provided and maintained by the system. The play lists also can be automatically updated by the system, e.g. through the media guide 335. Subscribers to a play list can automatically receive as downloads all of the media, e.g. songs, included in the play list. Further, as the play list is updated, the media downloaded to the subscribers can be updated as well, such as by downloading to the subscriber devices media that is newly added to the play list. Also, media removed from the play list can be automatically deleted from the subscriber devices. Additionally, play list services also can be used to facilitate the creation of custom play lists by subscribers and to permit other subscribers to access the subscribers' custom play lists.

Downloading of media to a subscriber device can be managed through synchronization services provided by the core servers 320. The synchronization is performed over-the-air between the core servers 320 and the subscriber's device, without connecting the subscriber's device to an additional computing device, e.g. a PC. An instance of each subscriber's account, which reflects the state at the corresponding subscriber's device, can be maintained by the core servers 320. When the instance of a subscriber's account changes, e.g. when content is requested for download or the content associated with a subscribed play list changes, the instance no longer reflects the state at the corresponding subscriber's device. Thus, the synchronization services can be used to update the subscriber's device, e.g. with respect to downloaded media content, when the account instance maintained by the core servers 320 does not match the subscriber's device state. For instance, media that has been added to a subscribed play list can be identified and delivered, e.g. through push services, to one or more subscribing users. Synchronization services also can be used to manage the download of media requested through the mobile communications device or the web interface.

Further, authorization services can be provided by the core servers 320, separately or in conjunction with a subscriber authentication server 330. For instance, a subscriber can be blocked from accessing media services, including downloading and playback, until the authorization services confirm that the subscriber's account is active. The subscriber authentication server 330 can be configured to maintain authentication information, such as account status, or to retrieve the authentication information from one or more other sources, e.g. billing systems or subscriber account databases. The subscriber also can be required to perform one or more verification and validation functions to confirm the subscriber's identity.

One or more statistics also can be generated by the core servers 320. The statistics can be associated with an individual subscriber, such as how frequently the subscriber plays a particular song or accesses a particular play list. The statistics also can be associated with multiple subscribers, such as how many times a song is downloaded. Further, the core servers 320 can communicate with a report agent 340 to generate statistics for one or more content providers.

Social services also can be provided by the core servers 320. The social services can be internal and/or external to the media system. For instance, internal social services can include introductions to other subscribers with similar tastes in media, the ability to review account information corresponding to other subscribers, e.g. friends, and messaging with other subscribers, e.g. regarding media content. Further, links can be provided to one or more external social services, such as through social gateway 350. For instance, a subscriber can interface with a social networking service, such as Facebook, MySpace, or Twitter, to provide information describing the subscriber's activities, such as identifying music to which the subscriber is currently listening. Additionally, a messaging gateway 355 also can be provided to facilitate messaging, e.g. through short message service (SMS) messages, between subscribers. In some implementations, messages also can be transmitted to one or more devices associated with users who are not subscribers.

Additionally, a ringback server 360 can be included in the media server environment 300. Ringback server 360 can store preconfigured ringback tones and ring tones that are accessible to subscribers. Further, ringback server 360 can be configured to permit users to generate custom ringback tones and ring tones based on media accessible through the core servers 320. For instance, a subscriber can select an item of music from the core servers 320 for download. The subscriber can then identify a portion of the selected item of music for use as a ringback tone or a ring tone, e.g. through specifying a beginning and end defining the portion to be used. Once generated, the ringback tone or ring tone can be stored locally at the subscriber's device. In some implementations, a separate ring tone server (not shown) can be included in the media server environment 300 instead of or in addition to the ringback server 360. The ring tone server can be configured to permit users to generate custom ring tones and/or to select preconfigured ring tones.

Collaborative filtering also can be provided by the core servers 320. The collaborative filtering can be used to automatically provide media recommendations to subscribers based on their previous interactions with the system, e.g. downloads, and/or the previous interactions with the system of one or more other users. Also, collaborative filtering can be used in conjunction with a recommendation service to facilitate music discovery. For instance, in response to a subscriber request, e.g. a one-click selection, the system can automatically provide (or push) one or more continually updating play lists to the subscriber's device. The content included in the one or more pushed play lists can be determined based at least in part on collaborative filtering. Further, the collaborative filtering can be used in conjunction with social services, e.g. introductions, such as to identify similarities between the media archive of a subscriber and those of one or more neighboring subscribers.

Figure 4:
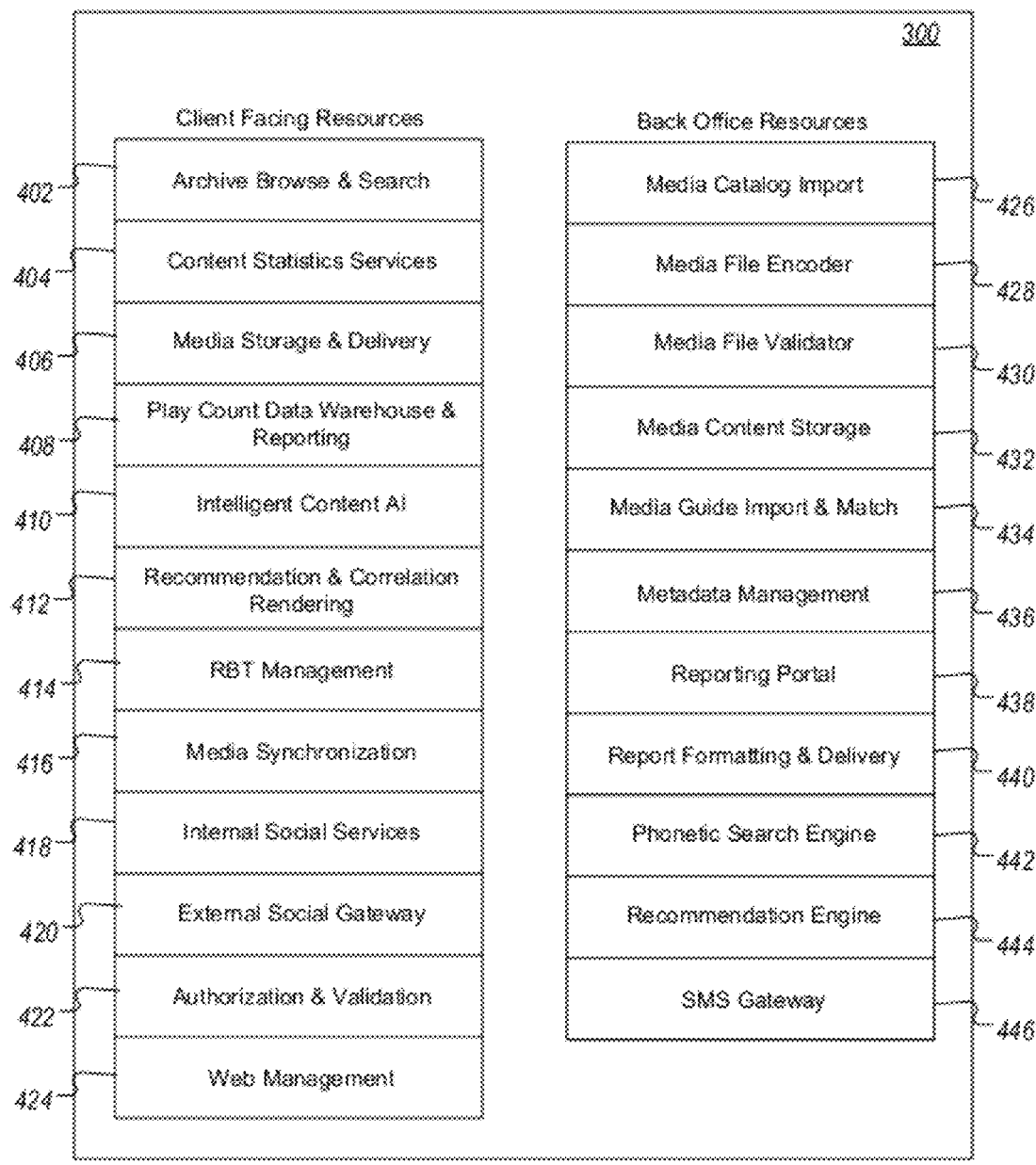
FIG. 4 shows an exemplary configuration of modules included in the media server environment.

FIG. 4 shows an exemplary configuration of modules included in the media server environment. The media server environment 300 can incorporate multiple modules, which can be implemented in the various included servers. The modules can be client facing resources, which provide services that are accessible to subscribers, or back office facing resources, which provide support and management functionality. In some implementations, additional, fewer, or different modules can be included.

An archive browse and search module 402 can provide catalog browsing and searching services for one or more media catalogs accessible through the media server environment 300. The archive browse and search module 402 can present items available in one or more media catalogs through direct lookup, e.g. through artist, title, genre, or other variable, and by search, e.g. for media items that include a search term in a title. Further, the archive browse and search module 402 can provide multiple views for presenting requested information, e.g. album view and track view for a particular artist. For instance, a subscriber can request to view all tracks by U2 and can be presented with one or more pages that present the corresponding tracks. Further, the archive browse and search module 402, alone or in combination with one or more other modules, can render results in a predetermined format, e.g. XML, that can be transferred to a corresponding mobile communications device using compression, e.g. HTTP compression (HTTPC). Also, the results can be streamed to the mobile communications device, e.g. using a Simple API for XML (SAX) parser, to permit search results to be rendered progressively.

A content statistics services module 404 can be configured to expose statistics maintained by the media server environment 300 to subscriber or system requests. In some implementations, the content statistics services module 404 also can make statistics available to content providers. The statistics can be presented in a user requested format, such as one or more charts or rank-ordered listings. For instance, the statistics can be used to generate a chart of the most frequently accessed media over a period of time, such as the top 20 downloaded country songs over the last day. The statistics also can be used to generate subscriber specific charts relating to a particular user or group of users, which can be viewed by subscribers within the same group, e.g. community. Additionally, the content statistics services module 404 can communicate with other modules to retrieve information used to generate and to provide statistics used for other functions, such as report generation or subscriber preference analysis.

Media storage and delivery module 406 can be configured to provide subscribers with access to media content. Access can be restricted to authenticated users who have either a current or active subscription to service that includes media content. For instance, media storage and delivery module 406 can communicate with authorization and validation module 422 to confirm that a subscriber is permitted to access media content. Further, media storage and delivery module 406 can transfer requested media content to a mobile communications device using a secure connection, e.g. over-the-air transmission using an HTTPS connection. Additionally, delivery of media content can be performed by progressive download, e.g. using HTTP 1.1, such that media can be accessed before downloading has been completed and to permit downloading to be paused and resumed.

Play count data warehouse and reporting module 408 stores data indicating downloads and plays of media content items by individual subscribers. The data stored by play count data warehouse and reporting module 408 can be provided to one or more other modules, including content statistics services module 404, the reporting portal module 438, the report formatting and delivery module 440, and the recommendation engine module 444. Further, data relating to the instance of the subscriber's account, e.g. download history, also is maintained. Additionally, data corresponding to play counts and downloads can be recorded in real-time or near real-time, such that an accurate image of the system is persistently available.

An intelligent content AI (artificial intelligence) module 410 is configured to generate play lists. The AI module 410 can access data other modules, including the content statistics services module 404, the recommendation and correlation rendering module 412, and the media synchronization module 416, to determine real-time or near real-time download and/or play back trends. Further, the AI module 410 can generate content for a play list for one or more categories of media content, e.g. genre or artist, based on the data received from other modules. The AI module 410 also can be configured to sequence the media content associated with a play list based on one or more criteria. For instance, media content can be arranged from highest to lowest relevance with respect to the play list in which it is included. Relevance can be determined based on one or more specified criteria, such as popularity rating and how recently the media content was added to the media collection. The media included in a play list also can be transferred to a requesting mobile communications device in accordance with the determined sequence, such that the most relevant media content is delivered first. Additionally, AI module 410 can be configured to support recommendation, e.g. "More Like This," functionality. For instance, a subscriber can submit a request for media content similar to a unit of media content, which can range from a single item, e.g. a song, to an entire media collection. In response, the AI module 410 can return one or more personalized and content-specific recommendations.

The recommendation and correlation rendering module 412 can receive ratings data from a collaborative filter, which can correlate items of media content. The recommendation and correlation rendering module 412 also can provide recommendations and correlations to one or more other modules. Correlations can be generated for media content and for subscribers. For instance, the recommendation and correlation rendering module 412, in conjunction with the collaborative filter, can identify statistically related content, based on consumer taste, for an item or a collection of identified media content. Also, in response to receiving the identification of one or more subscribers, the recommendation and correlation rendering module 412 can generate a list of other subscribers who share common musical preferences. In some implementations, the list of other subscribers can be further limited, e.g. based on geographic location, third party ratings, MyCommunity ratings, ratings based on all subscribers, and/or ratings based on a subset of subscribers.

Ringback tone (RBT) management module 414 provides an interface with a corresponding ringback server on a communications network. A subscriber's ringback tones can be managed, including adding and deleting tones, from either or both of a mobile communications device and a web-based management platform through RBT management module 414. Subscriber ringback tone settings also can be configured through the module. Thus, a ringback tone acquired through the media server environment 300 can be configured for use through RBT management module 414.

A ring tone management module (not shown) also can provide an interface with a corresponding ring tone server on a communications network. A subscriber's ring tones can be managed, including adding and deleting tones, from either or both of a mobile communications device and a web-based management platform through the ring tone management module. Subscriber ring tone settings also can be configured through the module. Thus, a ring tone acquired through the media server environment 300 can be configured for use through the ring tone management module. In some implementations, the ring tone management module and RBT management module can be consolidated, e.g. in a single module.

Media synchronization module 416 can synchronize the media catalog stored locally on the mobile communications device with the instance of the subscriber's media catalog maintained at the media server environment 300. The media synchronization module 416 communicates with the mobile communications device to identify differences between the corresponding media catalogs to identify a list of media content that is to be transferred to the mobile communications device. If multiple storage devices, e.g. memory cards, are used by the mobile communications device to store the local media catalog, the media synchronization module 416 can recognize the storage device presently in use. Further, the list can be prioritized based on one or more criteria, such as whether the media content was selected by the subscriber or is being provided based on a subscribed play list. Additionally, media synchronization module 416 can be adapted to maintain the metadata corresponding to a subscriber's account, including an indication of the items of media content, e.g. tracks, stored locally on the mobile communications device and an indication of the subscribed play lists.

An internal social services module 418 can manage the community interaction (or social interaction) that occurs in media server environment 300. For instance, a community can include friends and neighbors identified in conjunction with the collaborative filter. The account details of friends and neighbors can be viewed through community interaction, including any or all of the downloaded media catalog, play history, ring tones, ring back tones, and play lists. Community interaction also includes sending and receiving shouts (or messages) relating to media content.

Further, internal social services module 418 can perform or support media content related exploration, such as permitting a subscriber to compare their media collection with that of another user, e.g. a friend. Other exploration, including viewing another user's most frequently accessed media items or playback history also can be permitted. Additionally, internal social services module 418 can maintain a subscriber's social preferences and an indication of the subscriber's current geographical location, e.g. based on mobile communications device usage. This information can be used in the identification of neighbors and delivery of recommendations.

Social interaction provided through internal social services module 418 also can be extended through external social gateway 420. For instance, a subscriber can configure their account to direct shouts (or messages) they have generated to one or more external social services, such as Twitter and Facebook. A shout (or message) can include one or more links to content, such as a song or play list, and/or information. The external social gateway 420 permits communication with third-parties through published application program interfaces (APIs).

Authorization and validation module 422 provides authorization and validation services for subscribers seeking to access the media server environment 300. The authorization and validation module 422 can have a persistent connection to an account server, such that a subscriber's account status can be validated in real-time. If a subscriber's account is not current, e.g. has been suspended or closed, access to the media server environment 300 can be denied. Further, authorization and validation module 422 can continue to monitor a subscriber's account status while the subscriber is connected. If the subscriber's account lapses while the subscriber is connected, access can be terminated. The authorization and validation module 422 also can be adapted to inform a subscriber as to whether previously downloaded content should be accessible. Additionally, the authorization and validation module 422 can be configured to communicate with RBT management module 414 to enable and disable a subscriber's ringback tones and/or ring tones based on their account status.

Web management module 424 can be configured to support web-based management of a subscriber's account from any computer. Web-based browsing of the media catalog and content selection also can be provided, since content is transferred directly from media server environment 300 to the subscriber's mobile communications device. In some implementations, the web management module 424 can provide interfaces and functionality that mirror those provided through the mobile communications device. In some other implementations, one or more different interfaces can be provided, e.g. to utilize the expanded viewing area of a computer monitor, and one or more functions can be restricted or removed. Additionally, a downloadable widget can be provided in conjunction with web management module 424. The widget can be installed on any computing device, including any mobile computing device, and can be configured to scan one or more storage devices associated with the computing device to identify resident media content. Metadata identifying any discovered media content can then be provided back to web management module 424, so that the corresponding media content can be added to the subscriber's media catalog.

The back office resources can include a media catalog import module 426 that imports media and corresponding metadata from third-party partners, e.g. record label companies, into the media server environment 300. A change list can be generated in conjunction with each new file or set of files received from a third-party, e.g. so that the media catalog can be updated. The media catalog import module 426 also can be configured to validate each new file or set of files that have been received, and to flag any file that fails the validation. Additionally, either or both of the media content and corresponding metadata can be converted (normalized) into a format used within the media server environment 300. Media content that is received and validated can be stored in the media database and made available to subscribers.

A media file encoder module 428 can communicate with the media catalog import module 426, and can be adapted to encode some or all of the received media content, e.g. files that have not been pre-encoded, in a standard format. For instance, received music files that have not been pre-encoded can be encoded in the High-Efficiency Advanced Audio Coding version 2 (HE-AACv2) format. The encoded HE-AACv2 files can employ features to improve quality and/or compression, including spectral band replication and parametric stereo. A media file validator module 430 also can communicate with the media catalog import module 426 to perform file validation. For instance, the media file validator module 430 can check each received file to verify that it is encoded in the proper format (using the proper codec) and at the proper bit rate. Further, the media file validator module 430 can check the number of channels and duration corresponding to the file. A file that is validated can be made available to subscribers as part of the media catalog. Alternatively, a file that fails validation for any reason can be flagged and kept separate from the media catalog. In some implementations, the media file validator module 430 also can include media recognition technology to validate that the file corresponds to the correct item of media, e.g. the song it is supposed to be.

Media content and storage module 432 can provide a virtual file system that spans multiple storage devices. The physical delivery of media content to requesting subscribers can be performed through media content and storage module 432. Further, the media content can be replicated at the file level in order to provide redundancy. By using multiple, physically independent storage devices and/or redundant files, requested files can be more quickly served to subscribers.

The media guide import and match module 434 matches metadata received from one or more media guides, e.g. the All Music Guide, with media content included in the media catalog. The received metadata can be linked with either or both of files and metadata from other sources stored in the media database. As a result, rich metadata associated with the media content can be provided to subscribers. For instance, the metadata included through the media guide import and match module 434 can include data to enrich presentation, such as album art and artist portraits. Additionally, the received metadata can be used to enhance recommendation functionality.

Metadata management module 436 provides a management interface that allows administrators to modify metadata associated with files, including overriding existing metadata and adding content details. Metadata can be overridden because administrator-supplied content details can be given precedence, upon publishing, over metadata supplied by third-parties. Further, metadata management module 436 provides the ability to manage media content for inclusion in system-generated play lists.

Reporting portal 438 can receive and/or extract statistics from other modules and system resources, and provides the statistics for use by administrators and third-parties, e.g. content providers. Through reporting portal 438, reports can be specified, designed, and scheduled for delivery. Further, reports can be generated in real-time to reflect the current state of the system, including reports on subscriber actions, loading, scaling, and module performance. Reports, both scheduled and real-time, can provide granularity down to individual items of media content. Report formatting and delivery module 440 can receive reports generated by the reporting portal 438 and format them in accordance with requirements specified by third-parties. Once formatted, report formatting and delivery module 440 can deliver the reports to the appropriate third-parties. In some implementations, the reports also can be compressed prior to delivery.

Phonetic search engine 442 can be configured to process queries from subscribers. The queries can be submitted through either or both of a mobile communications device and a web-based computing device. In some implementations, the phonetic search engine also can provide support for non-subscriber facing functions, such as content matching and content import functions. A relational also-known-as (AKA) database can be included to provide matches for common misspellings and to provide a by-pass for previously matched items. The phonetic search and AKA database improve searching by providing results even when subscribers do not know the exact spelling and by overcoming typing errors, e.g. resulting from space-limited interfaces on mobile communications devices.

In performing a phonetic search, the received search phrase can be deconstructed and submitted to artificial intelligence reference analysis. The reference analysis can include one or more analysis tools, such as a phonetic index, a dictionary of common typographical errors, and an AKA dictionary. Further, the analysis also can reference either or both of a media content metadata store and an intelligent search cache. After the analysis has been performed, the search phrase can be reconstructed and the search results can be provided.

Recommendation engine 444 generates the data stored in the recommendation and correlation rendering module 412, which is periodically refreshed. The recommendation engine can generate data used for recommendations by aggregating and comparing data describing subscribers with data describing available content. In some implementations, the recommendation engine 444 can support the concepts of any or all of trust, Bayesian boosting, and temporal relevance, which can improve the relevance of recommendations for at least some content, e.g. music. SMS gateway 446 processes all actions and communications that are to be provided to a subscriber in the form of an SMS message. The SMS gateway 446 can interface with a platform associated with the media server environment 300 or an SMS platform provided by a third-party.

Figure 5:
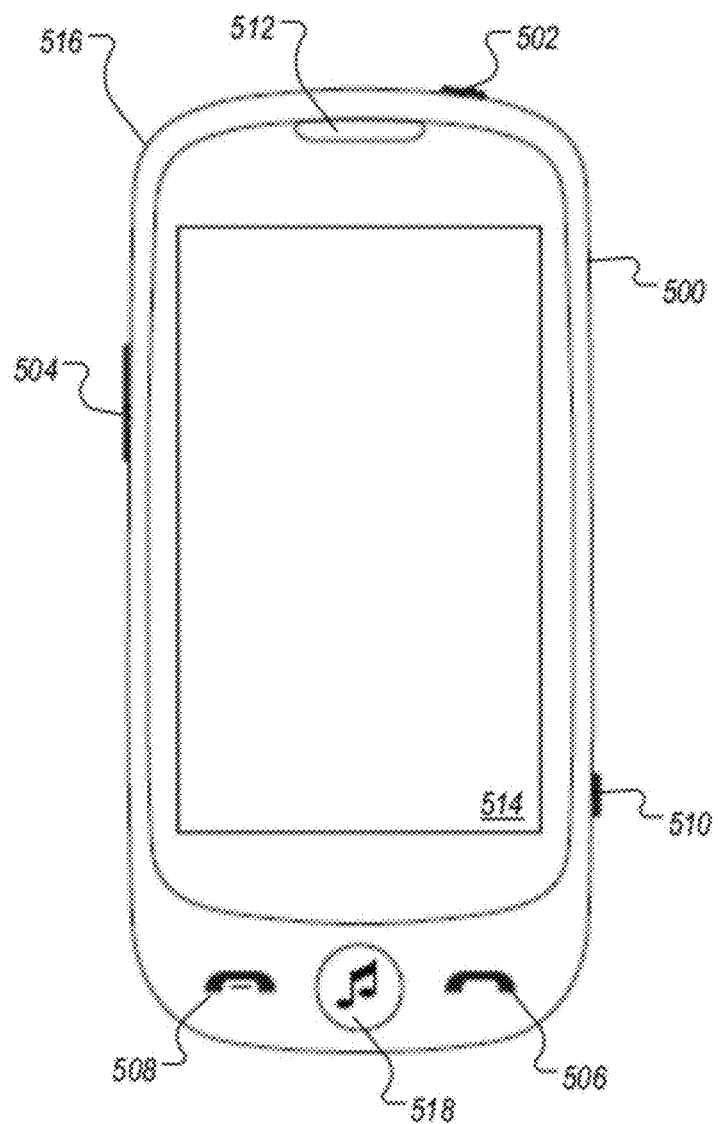
FIG. 5 shows an exemplary mobile communications device for use with the media server environment.

FIG. 5 shows an exemplary mobile communications device for use with the media server environment. Mobile communications device 500 can be configured to provide wireless voice communication and data communication. Mobile communications device 500 can include physical controls, e.g. a power button 502, a volume control 504, a phone button 506, an end call button 508, and a camera button 510. Further, mobile communications device 500 can include outputs, such as microphone 512 and display 514, which can be a touch sensitive display, e.g. resistive or capacitive. In some implementations, mobile communications device 500 also can include one or more speakers 516 configured to output voice and/or music. The one or more speakers can be located on either or both of the back and front of mobile communications device 500. Further, an accessory jack, e.g. for headphones, also can be included.

Additionally, mobile communications device 500 can include a media button 518, which can be used to access media functionality. In some implementations, the media button 518 can be a multi-function button. For instance, a single press of the media button 518 can toggle the display between a media playback interface and the phone interface. Further, pressing and holding the media button 518 can cause an interface corresponding to the media service, e.g. a home menu, to be presented. The mobile communications device 500 can be configured such that accessing the media button 518 causes the corresponding media functionality to be presented, regardless of the previous function being performed and location within the device's command hierarchy.

Figure 6:
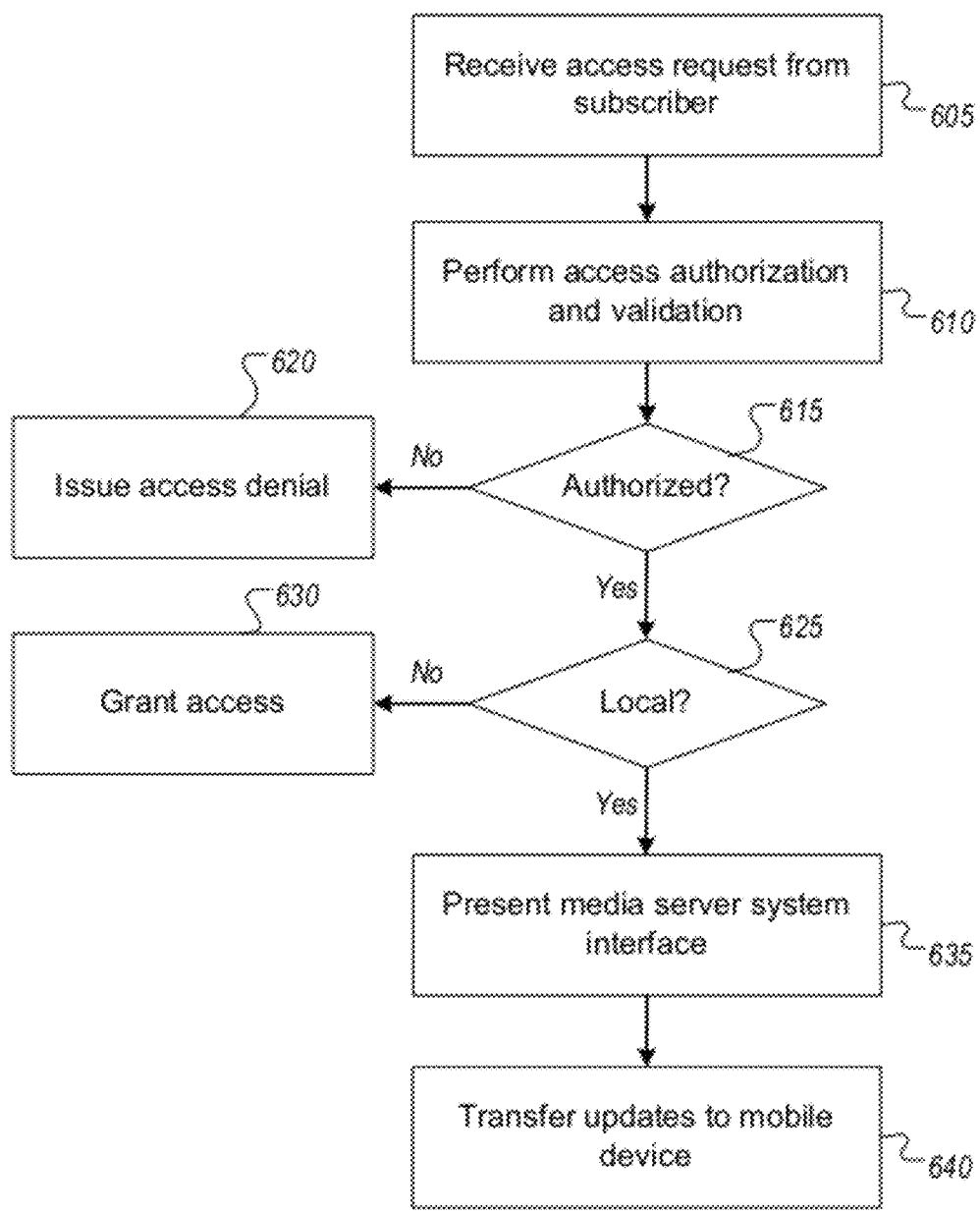
FIG. 6 shows an exemplary process flow for accessing media content and applications.

FIG. 6 shows an exemplary process flow for accessing media content and/or applications. In the unlimited media access system, media content and applications can be stored locally on a mobile communications device, e.g. using one or more secure memory cards. Further, the unlimited media access system can provide truly unlimited access to and unlimited use of available media content in some instances.

Alternatively, the unlimited media access system can include one or more express and/or inherent restrictions, such as a limit on the amount of media content that can be stored locally on a subscriber device at any given time and a limit on the amount of network usage (download traffic) over a given period of time, e.g., measured in megabytes or gigabytes. In order to access local media content and applications, the subscriber's account to which the device corresponds must be active. In some implementations, the subscriber's account for unlimited media and unlimited application access can be part of a plan that also provides unlimited communications services, including one or more of voice communications, data communications, and messaging. In some other implementations, the subscriber's account for unlimited media and unlimited application access can be charged as one or more additional services related to an underlying account for communications services, including any or all of voice, data, and text communications. In still other implementations, the subscriber's account for unlimited media access can be separate from any account for application access and for communications services. For example, a subscription can be obtained for access to applications, a separate subscription can be obtained for media access, and yet another, separate subscription can be obtained for communication services.

A request for access can be received from the subscriber device when access to locally stored media content, a locally installed application, or the media server environment is requested (605). In response to a request, an access authorization and validation operation can be performed (610). For instance, the subscriber's account status can be determined by the authorization and validation module to confirm that it is current. If the access request is received from a mobile communications device, information identifying the subscriber's account can be received with the request, e.g. a mobile identification number (MIN). Alternatively, if the access request is received from a web-based device or the identifying information is not received, a request for identification can be presented to the subscriber, e.g. as a username/password prompt.

Based on the access authorization and validation operation, it can be determined whether the subscriber is authorized (615). If the subscriber is not authorized, an access denial message can be presented (620). Further, the message can include one or more reasons for the denial. Otherwise, if the subscriber is authorized, it further can be determined whether the subscriber is requesting access only to local content or a local application (625). If access to local content or a local application is being requested, the access can be granted and a requested operation, e.g. playback, can be executed (630). In some implementations, a request for local access can be performed transparently, so that the subscriber is not required to perform any operations. Further, access to local content and/or applications can be authorized for a predetermined period of time, e.g. a day, or for the duration of a pre-paid period, e.g. a month of service. In some implementations, a subscriber can provided with unlimited use of an application while the subscription is valid. For example, a subscriber can be granted unlimited play with respect to a game application as long as a subscription providing access to that game application is valid. In some other implementations, a subscriber can be subject to restrictions even where unlimited access to applications has been granted. For example, an interactive game application that communicates with external devices, e.g. over a data network connection, can be subject to network traffic limitations. Accordingly, in some implementations, authorization and validation also can be configured to confirm that a subscriber has not exceeded a related restriction, such as a network traffic limitation. In other implementations, access to an application can be controlled independently of other restrictions.

If access to the media server environment was requested, an interface corresponding to the media system, e.g. a home screen, can be presented to the subscriber (635). The subscriber can then be permitted to access functionality provided by the media server system, including media searching, media browsing, application searching, application browsing, downloading selected media, and social services. Additionally, any pending updates, e.g. new media and/or application software, can be transferred to the mobile communications device (640).

Figure 7:
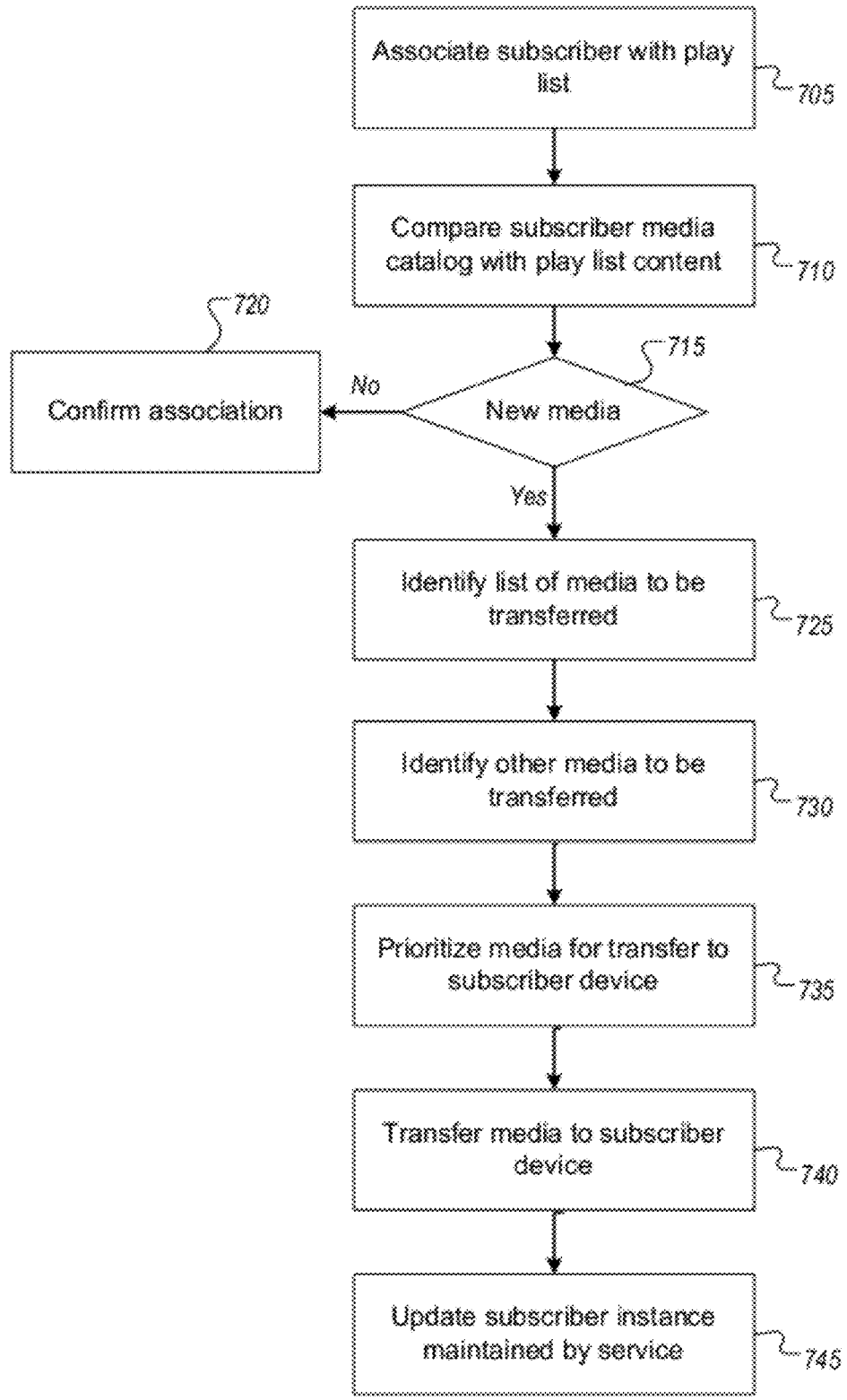
FIG. 7 shows an exemplary process flow for providing content corresponding to a subscribed play list.

FIG. 7 shows an exemplary process flow for providing content corresponding to a subscribed play list. Play lists can be maintained in the media server environment. For instance, either or both of system generated play lists and third party-provided play lists can be provided for a wide range of categories, including artists, time periods, and genres. The third party-provided play lists can be created and managed by a separate entity, such as a content provider. The system generated play lists can be created and managed by an administrator. Also, the system can generate play lists through artificial intelligence, e.g. using the collaborative filter and one or more modules, such as the intelligent content AI module 410. Further, play lists can be generated by subscribers. For instance, a subscriber can view and subscribe to play lists generated and maintained by friends and neighbors visible in the subscriber's community. A subscriber also can generate and maintain their own play lists.

A subscriber can be associated with a play list, e.g. in response to creating the play list or through subscribing to it (705). The subscriber's media catalog (or library, archive, or collection) can be compared with the media, e.g. songs, included in the play list (710). Based on the comparison, it can be determined whether any of the media included in the play list is not stored locally in the subscriber's media catalog (715). If there is no new media in the play list, the association between the subscriber and the play list can be confirmed (720). Further, the comparison can be performed periodically, e.g. in response to modifications to the play list and/or the subscriber's media catalog. If new media is included in the play list, the list of media content to be transferred to the mobile communications device for local storage is identified (725). For instance, the media content to be transferred can be added to a download queue or list. Further, any other media to be transferred to the device also can be identified (730). For instance, one or more songs can be selected for download by the subscriber during the same session in which the play list is subscribed to. Further, one or more previously selected items of media content may still be awaiting transfer.

The media content that is to be transferred to the subscriber's mobile communications device can be prioritized (735). For instance, media that the subscriber has requested for immediate play back can be given the highest priority and transfer can begin as soon as possible. Further, the remaining media content can be prioritized based on one or more criteria, such as popularity, how recently the media content was added to the media catalog, the position of the media content within the subscribed play list, and how long the media content has been awaiting transfer. The media content can be transferred to the device in accordance with the prioritization, such that the highest priority content is transferred first (740). Additionally, the instance of the subscriber's account maintained by the media server environment can be updated to reflect the transferred media content (745). As a result, the associated media content will not be identified for transfer again, even if it is selected by the subscriber or included in another subscribed play list, unless it has been deleted from the subscriber's device.

Figure 8:
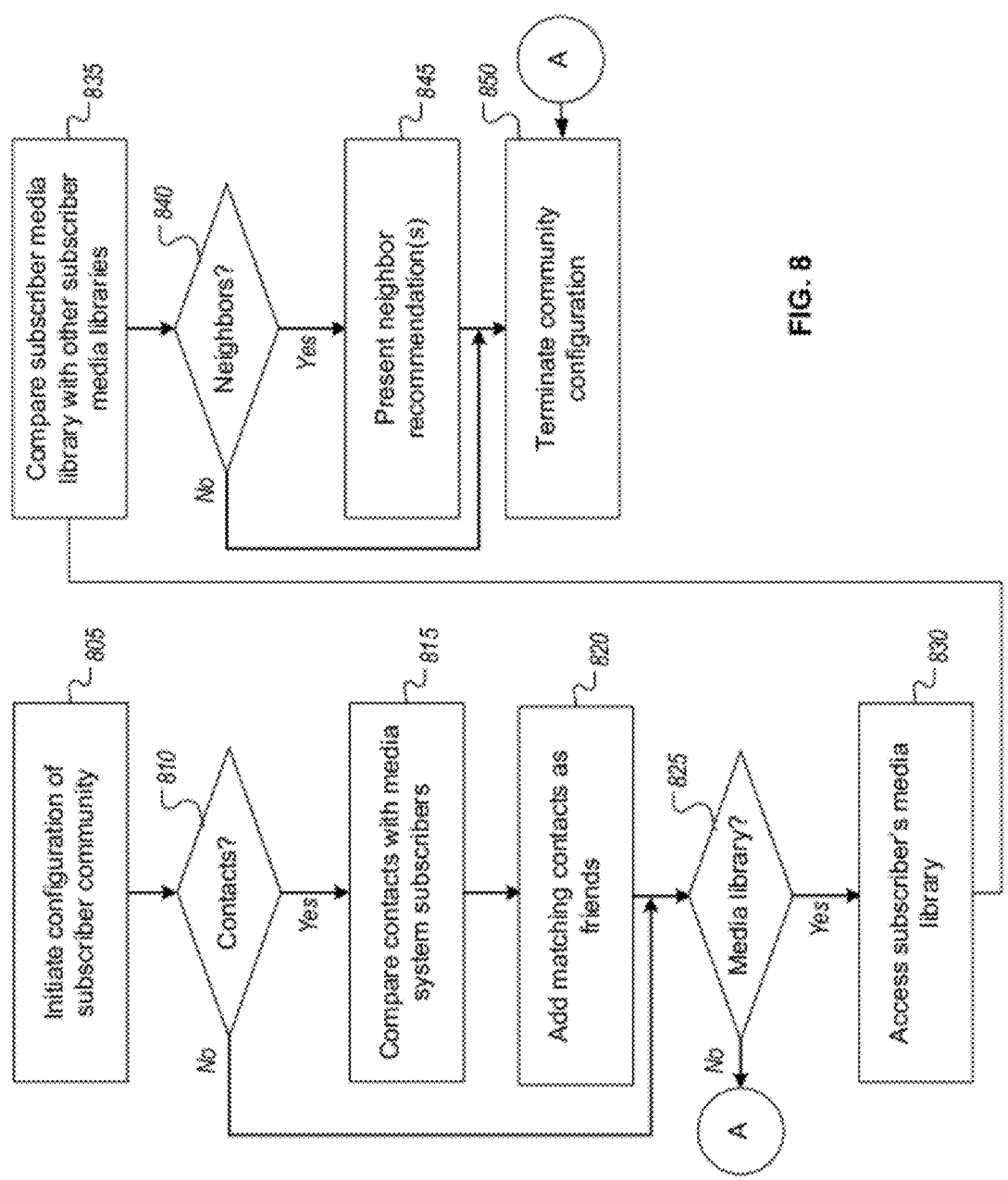
FIG. 8 shows an exemplary process flow for configuring a subscriber's community.

FIG. 8 shows an exemplary process flow for configuring a subscriber's community. The community can provide a forum for social interaction within the media server environment. Further, the community for each subscriber can be different, as it includes other subscribers with whom the subscriber has formed a connection. The community can include friends, with whom the subscriber has formed an explicit connection, and neighbors, who can be identified to the subscriber based on one or more common aspects, such as music preferences.

Configuration of a subscriber's community can be initiated, e.g. in response to the subscriber accessing the community portion of the media server environment (805). It can be determined, whether the subscriber has stored or otherwise identified any contacts (810). For instance, a contact list maintained on the subscriber's mobile communications device can be analyzed and contact information can be extracted. Further, a computing device from which web-based management is performed also can be scanned to identify any defined contacts. If any contacts are identified, information identifying the one or more contacts can be provided to the media server environment, e.g. to the internal social services module 418. The identified contact information can then be compared with information identifying subscribers to the media system (815). For instance, name, phone number, and/or e-mail address information can be used to determine whether any of the identified contacts also are subscribers to the media system. If any matching contacts are identified, the contacts can be automatically added to the subscriber's community as friends (820). In some implementations, the addition of contacts as friends can require subscriber approval. Additionally, the subscriber's contact list can be analyzed periodically to determine whether any new contacts who also are subscribers have been added. Newly discovered contacts who also are subscribers can be added as friends as they are discovered.

Further, it can be determined whether the subscriber has created a media library (or catalog or archive) (825). If the subscriber has not created a media library, configuration of the subscriber's community can be terminated (850). Otherwise, the subscriber's media library can be accessed (830). The subscriber's media library can then be compared with the media libraries maintained by other subscribers (835). For instance, a community of other subscribers who are located within a predetermined distance of the subscriber can be evaluated. It can be determined, based on the comparison, whether there are any other subscribers who are located within a threshold distance of the subscriber who have similar preferences in media (840). In some implementations, proximity and preference can be weighted, such that a strong value for one criteria can offset or overcome a weaker value for the other criteria. Other subscribers who satisfy the proximity and preference evaluation can be presented to the subscriber as neighbor recommendations (845). If there are no other subscribers who satisfy the proximity and preference evaluation or once the neighbor recommendations have been presented, the community configuration can be terminated (850).

Figure 9:
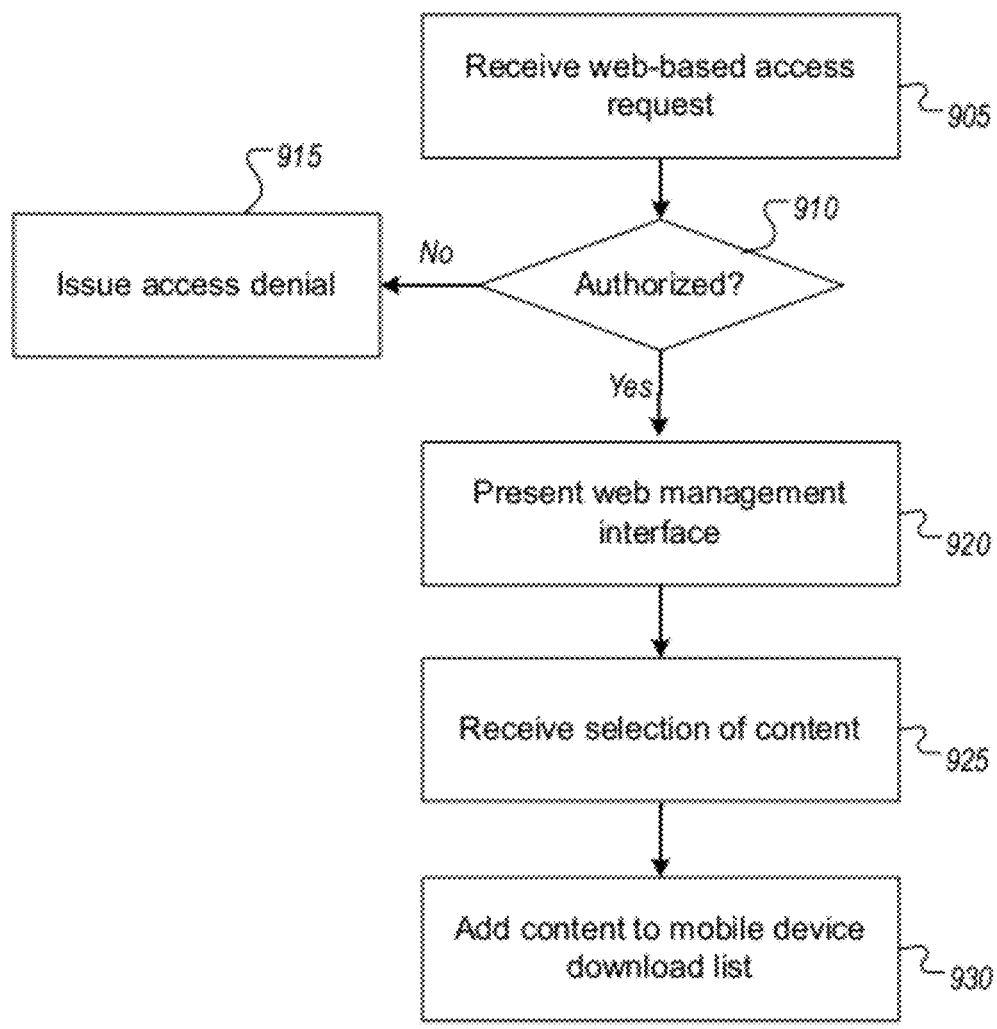
FIG. 9 shows an exemplary process flow for web-based access to a media server environment.

FIG. 9 shows an exemplary process flow for web-based access to a media server environment. A media server environment providing access to media content and/or applications for mobile communications devices can be configured to communicate with other computing devices over public and/or private data networks, e.g. the internet. The media server environment can receive a web-based access request from any networked computing device (905). For instance, the media server environment can be accessible through a browser at one or more published Uniform Resource Locators (URLs). Upon receiving the web-based access request, the media server environment can determine whether the request is from an authorized subscriber (910). For instance, the requestor can be prompted to supply a username/password pair, or other such identification information. If the requestor does not have valid identification information, or if the requestor's account is not active, an access denial message can be issued (915).

If the request is from an authorized user, a web-management interface can be presented (920). The web-management interface can include a home menu (or top-level menu) that can provide links to additional interface screens, each of which can provide access to functions supported by the media server environment, including media search, application search, and community functions. In some implementations, the web-management interface can replicate the interface available on the mobile communications device and provide identical functionality. In some other implementations, the web-management interface can be formatted differently, e.g. to make use of a larger available display area. The web-management interface also can include reduced functionality with respect to the mobile communications device and/or the provided functionality can differ in at least some respects.

A content selection can be received through the web-management interface (925). The content selection can specify one or more items of media content that are to be downloaded. Alternatively or additionally, the content selection can specify one or more applications that are to be downloaded or otherwise installed. In some implementations, the subscriber's account status can be verified again before the content selection is processed, e.g. to verify that the subscriber's account remains current. The selected items of content, i.e., media content items and/or applications, can be designated for transfer to the mobile communications device, e.g. by adding them to a download list corresponding to the device (930). The selected items of content can then be transferred directly to the mobile communications device, e.g. via an over-the-air transfer. If the mobile communications device is off-line or becomes unavailable before the transfer has been completed, the selected items that have not been downloaded can be preserved in the download list until they are successfully transferred. Additionally, the instance of the subscriber's account maintained by the media server environment can be updated to reflect the transferred items of selected content.

Figure 10:
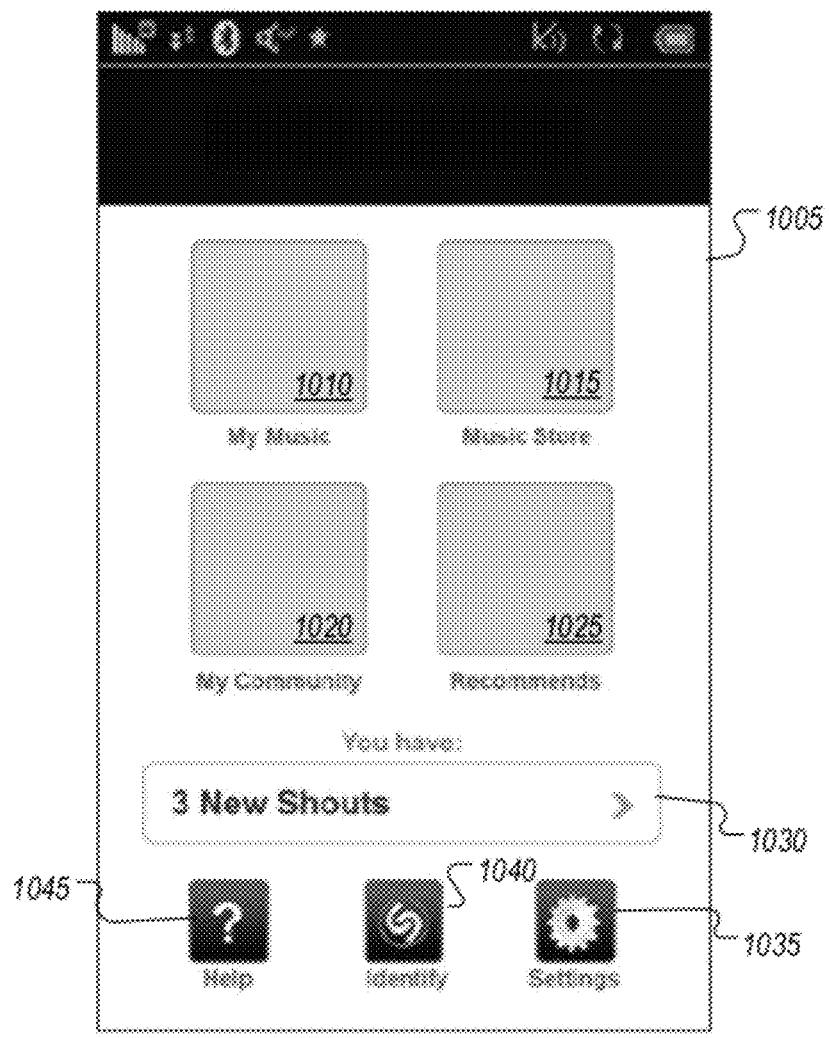
FIG. 10 shows an exemplary interface corresponding to a home menu of the unlimited media system.

FIG. 10 shows an exemplary interface corresponding to a home menu of the unlimited media system. The interface can be presented on a mobile communications device display, such as in response to input to the music button on the device. The interface, or a similar interface that includes at least a portion of the elements, also can be presented on a computer used for web-based management. The home interface 1005 can include context icons 1010-1025, corresponding to functional areas of the unlimited media service. For instance, My Music icon 1010 can represent a portion of the service that includes a subscriber's media catalog. The My Music icon 1010 can be selected to access locally stored media content, e.g. for browsing and playback. Also, a Music Store icon 1015 can represent a portion of the service that includes media available for download by subscribers. Accessing the Music Store icon 1015 can permit a subscriber to enter the system's music catalog, e.g. to browse or search for new media. Selected media can be downloaded to the subscriber's device and then be accessible under the My Music icon 1010.

A My Community icon 1020 can represent the social networking aspect of the unlimited media service, as configured for the subscriber. Friends and neighbors associated with a subscriber's account can be accessed by selecting the My Community icon 1020. Further, messages, e.g. shouts, received by the subscriber can be accessed within the community area. A Recommends icon 1025 also can be provided, which represents media recommended by the unlimited music service. In some implementations, other recommendations also can be provided under the recommendations portion of the service.

An alert area 1030 also can be included in the home interface 1005, which can provide notification of new items, such as newly received messages, the synchronization status of the device, and updates to subscribed play lists. The alert area 1030 also can provide notice of the number of new items, such as how many new messages have been received. Further, the alert area 1030 can be selected to view the new items that are identified.

Additionally, one or more service icons can be provided. Settings icon 1035 can be selected to view and modify configuration settings corresponding to the unlimited music service account and functionality on the mobile communications device. Also, a music identification icon 1040 can be provided on the home interface 1005 to permit a subscriber to quickly access music identification functionality. For instance, the music identification icon 1040 can be selected when an unknown song is being played and any results can then be presented on the device. A help icon 1045 also can be provided, which can be selected to access a help function associated with the unlimited music service.

Figure 11B:
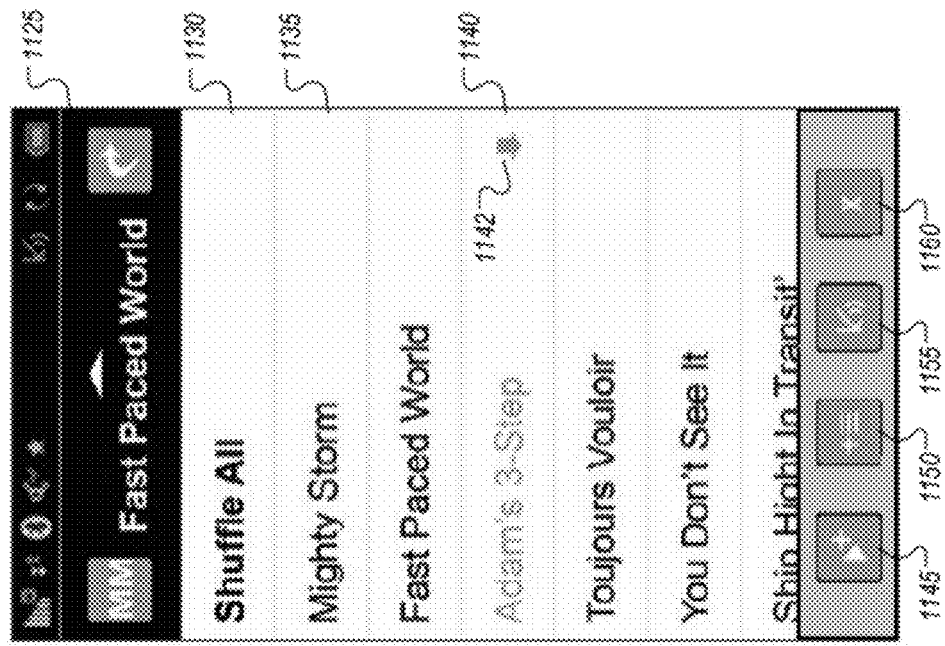
FIGS. 11A and 11B show exemplary interfaces corresponding to a local media archive context of the unlimited media system.
Figure 11A:
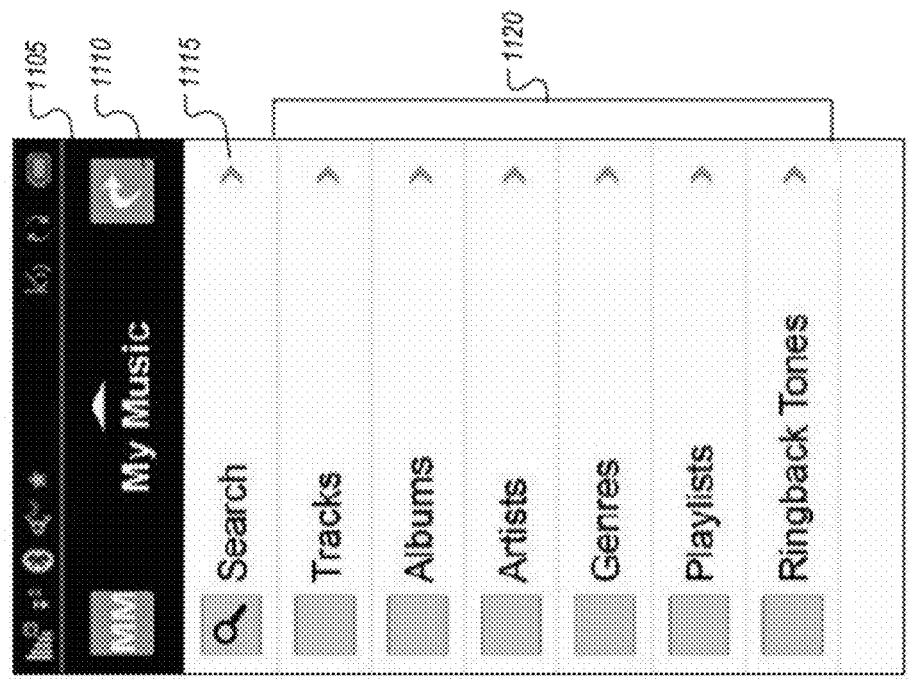

FIGS. 11A and 11B show exemplary interfaces corresponding to a local media archive context of the unlimited media system. FIG. 11A shows a My Music context menu 1105, which includes icons and menu options corresponding to available functionality. A return icon 1110 can be selected to return to a home interface, e.g. the home interface 1005. Also, a search icon 1115 can be accessed to search the local media archive stored on the mobile communications device. Selecting the search icon 1115 can cause a search menu or other such search interface to be displayed. Further, media categories options 1120 can be presented, including tracks, albums, artists, genres, play lists, ringback tones, and ring tones (not shown). Selecting a media category from the available options permits a subscriber to browse the local media archive based on the selected category. For instance, selecting the artists' media category presents a list of locally stored media organized by artist.

FIG. 11B shows an interface presented in response to the selection of an album, e.g. through the My Music context menu 1105. The album interface 1125 can include elements which provide functionality relating to the selected album. For instance, a shuffle option 1130 can be presented to play back all of the locally available tracks in a random (or shuffled) order. Further, the album interface 1125 can include an entry corresponding to each track included in the album. Tracks that are locally available, e.g. Mighty Storm 1135, can be presented in one format, such as black text. Tracks that are not locally available, e.g. Adam's 3-Step 1140, can be presented in another, visually distinct, format, such as gray text. Further, a download icon 1142 can be presented in conjunction with a track that is not locally available. The download icon, e.g. 1142, can be selected to request that the corresponding track be downloaded to the local media collection.

Additionally, one or more controls can be included in the album interface 1125. For instance, an add to play queue button 1145 can be included to indicate that one or more presently selected tracks are to be appended to a list of songs to be played. Also, an add to play list button 1150 can be selected to add one or more presently selected tracks to a play list. Selecting the add to play list button 1150 can cause a menu of available play lists to be presented, such that the selected tracks can be added to the correct play list. In some implementations, an option to create a new play list also can be presented. A shout button 1155 can be selected to generate a shout message that includes the one or more presently selected tracks. A shout template can be presented in response to selection of the shout button 1155, and further can be pre-populated with a link or other information corresponding to each selected track. Further, a delete button 1160 can be selected to remove the one or more presently selected tracks from the local media catalog.

FIGS. 12A-12C show exemplary interfaces for controlling the playback of media in the unlimited media system. FIG. 12A shows playback interface 1205, which can be presented in response to the selection of a media item, e.g. a song. Further, playback interface 1205 also can be presented when a media item is being played back automatically, e.g. during playback of a play list. The playback interface 1205 can include an audio controls button 1210, which can be selected to access audio controls for adjusting one or more playback parameters. A track list icon 1215 also can be presented, which can be selected to return to a track view of the media being accessed, such as a play list or album view.

A playhead indicator 1220 can be presented to indicate the present position of playback within the item of media content. In some implementations, the point of playback can be controlled by moving the playhead with respect to the media timeline. The playhead indicator 1220 also can identify one or more of elapsed playback time, remaining playback time, and total playback duration for the item of media content being played. Further, information indicating the position of the media item in a larger collection, e.g. a play list or album, also can be presented. For instance, if a song being played back is the third track in an album having sixteen total tracks, the text "3 of 16" can be displayed.

A media graphic 1225, such as album art or an image of the artist, also can be presented in the playback interface 1205. In some implementations, one or more control menus can be toggled between displayed and hidden states by selecting the media graphic 1225. For instance, a function control menu 1230 and a playback control menu 1235 can be alternatingly hidden and exposed. The function control menu 1230 can include control elements, e.g. buttons, corresponding to available media service functions. For instance, any or all of a download button, an add to play list button, a shout button, a create ring tone button, and a get ringback tone button can be included in the function control menu 1230. Additionally, the playback control menu 1235 can include one or more playback control elements, e.g. buttons, which can be selected to control playback of the media item. For instance, the playback control menu 1235 can include any or all of a forward seek, reverse seek, and pause/play button.

FIG. 12B shows an exemplary audio controls interface 1240, which can be presented in response to selection of audio controls button 1210. The audio controls interface 1240 can include an audio leveling selector 1245, which can include a range of general audio leveling functions, e.g. from off to high. Further, one or more custom leveling functions also can be provided. For instance, the audio controls interface 1240 can include a custom option 1250, which can be used to specify custom level settings corresponding to one or more channels. One or more genre specific leveling options 1255 also can be provided, e.g. blues, jazz, classical, rock, etc.

In some implementations, a genre specific option can be selected first and then customized by selecting custom option 1250. Any changes to the audio leveling can be abandoned by selecting the cancel button 1260 or applied by selecting the done button 1265.

FIG. 12C shows an exemplary custom leveling interface 1270, which can be presented in response to selection of the custom option 1250. Custom leveling interface 1270 can include a control region 1275, in which level controls corresponding to various audio channels can be presented. For instance, sliders corresponding to separate channels can be presented and individually manipulated to specify a custom leveling option. In some implementations, other control mechanisms, e.g. dials, can be used in place of the sliders. Any changes to the audio leveling can be abandoned by selecting the cancel button 1280 or applied by selecting the done button 1285.

Figure 13B:
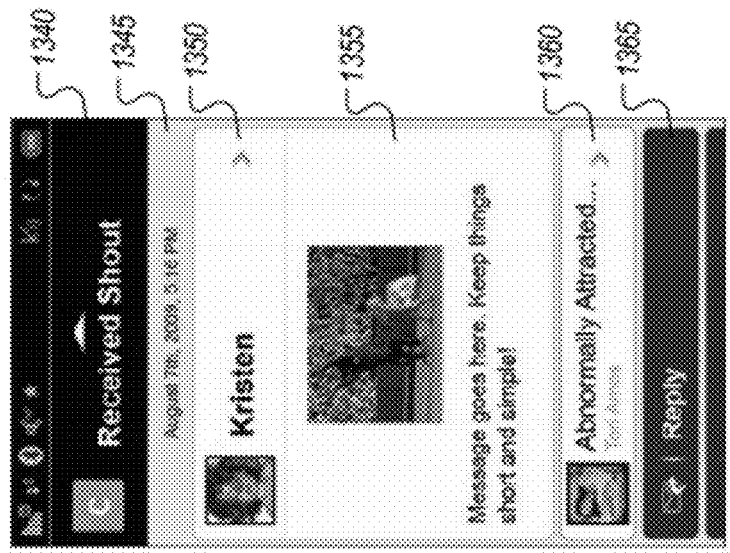
FIGS. 13A and 13B show exemplary interfaces for sending messages and viewing received messages in the unlimited media system.
Figure 13A:
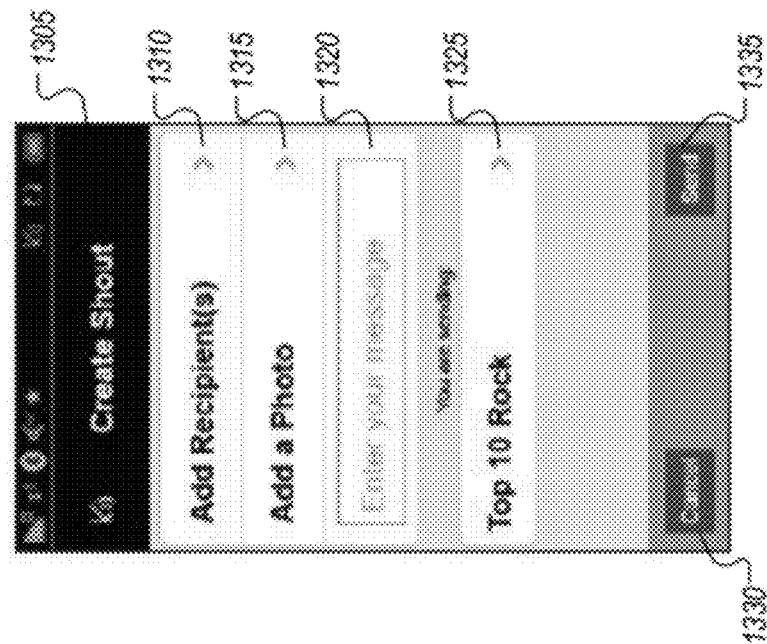

FIGS. 13A and 13B show exemplary interfaces for sending messages and viewing received messages in the unlimited media system. FIG. 13A shows a message (shout) creation interface 1305, which serves as a template for message creation. The message creation interface 1305 can include an add recipient field 1310, which can be selected to show a list of available recipients. For instance, either or both of the friends and neighbors associated with a subscriber can be presented in response to selection of the add recipient field 1310. Further, one or more options to address a group, e.g. all subscribers or Los Angeles subscribers, also can be presented. One or more recipients can be selected from the options presented in the add recipient field 1310.

An add photo field 1315 also can be included in the message creation interface 1305. Selecting the add photo field 1315 can cause a menu of available images, e.g. stored locally on the device or accessible from a networked location, to be presented. Further, an option to take a new photo, e.g. with a camera integrated with the device, also can be presented. If a photo is selected, it will be included in the message. Additionally, a message field 1320 also can be included in the message creation interface. The message field 1320 can be a text field which can receive text through any interface, including a physical keyboard or keypad, a virtual keyboard or keypad, and a microphone. In some implementations, the message field 1320 can be configured to enforce one or more rules, such as a character limit.

Further, a media selection field 1325 can be included in the message creation interface 1305. The media selection field 1325 can identify the media item or items associated with the message. For instance, if the message is being generated in response to selection of a shout control during playback of a song, that song can be identified in the media selection field 1325. By selecting media selection field 1325, the media associated with the message also can be changed. Also, although media is associated with the message, a copy of the media need not be transmitted with the message. For instance, because the message is transmitted within the context of the unlimited music system, the media can be accessed by any message recipient through an identifier. A message generated in the message creation interface 1305 can be abandoned by selecting the cancel button 1330 or transmitted to the one or more identified recipients by selecting the send button 1335.

FIG. 13B shows a message (shout) viewing interface 1340, in which a received message can be presented. A date/time identifier 1345 can be included in the message viewing interface 1340 to indicate the date and time at which the message was generated, received, or opened. Further, a sender field 1350 can identify the subscriber from whom the message was received. The sender field 1350 can display a subscriber identifier, e.g. a user name, and also can present a picture or avatar associated with the sender. Further, the sender field 1350 can be selected to access information corresponding to the sender, such as the sender's social profile.

A message field 1355 can include a photo, or other such image, and the text message provided by the sender. Further, a media field 1360 can identify the media associated with the message, such as by one or more of song title, artist, and album. The media field 1360 can be selected to access the corresponding media. In some implementations, accessing the media field 1360 can cause the media to be downloaded to the subscriber's mobile communications device. In some other implementations, accessing the media field 1360 can cause a preview of the media to be presented. Additionally, one or more message options also can be presented in the message viewing interface 1340, such as reply 1365, reply all, or forward (not shown).

FIGS. 14A-C show exemplary interfaces for selecting and operating on media in the unlimited media system. FIG. 14A shows a track interface 1405 in which one or more of the tracks can be selected. A select all option 1410 can be included to select all of the included tracks. Alternatively, tracks can be selected individually, such as by actuating a physical control or by providing touch input to the interface. Selected tracks can be visually identified, e.g. by displaying them with highlighting or shading, such as the track Mighty Storm 1415. In contrast, unselected tracks can be presented without highlight, shading, or other such visual identification, such as the track Adam's 3-Step 1420. The selection of tracks can be abandoned by selecting the cancel button 1425 or accepted by selecting the done button 1430. Once selected, the tracks can be used to perform one or more functions.

FIG. 14B shows a play queue interface 1435, which indicates the number of presently selected tracks 1440. The play queue can be used for any type or types of media content. A number of playback functions can be performed in play queue interface 1435. For instance, the play now button 1445 can be selected to stop playing the current item and to start playing the one or more selected items. Once the one or more selected items have been played, playback of the queue can be resumed.

Also, the play next button 1450 can be selected to cause the one or more selected tracks to be played after playback of the current item ends. Once the one or more selected items have been played, playback of the queue can be resumed. Further, an append to queue button 1455 can be selected to add each of the selected tracks to the end of the current playback queue. A replace queue button 1460 also can be included, which can delete the current queue and replace it with a new queue based on the presently selected tracks. Additionally, a more like this button 1465 can be selected to request the system to identify or recommend additional media content that is similar to the selected tracks. Actions with respect to the playback queue also can be abandoned by selecting the cancel button 1470.

FIG. 14C shows a play list interface 1475, which includes one or more play lists associated with the subscriber, e.g. play lists 1480. The play lists 1480 can be subscriber generated play lists, system generated play lists, third party-provided play lists or a combination thereof. If one of the play lists 1480 is chosen, the selected tracks are added to the chosen play lists. In some implementations, a play list that is chosen can be opened to identify the media content already included. An additional prompt can then be issued to confirm that the selected tracks are to be added to the chosen play list. Alternatively, a create new play list button 1485 can be selected to generate a new play list based on the selected tracks. If a new play list is generated, one or more additional prompts can be displayed, e.g. prompting the subscriber to name the play list.

Figure 15:
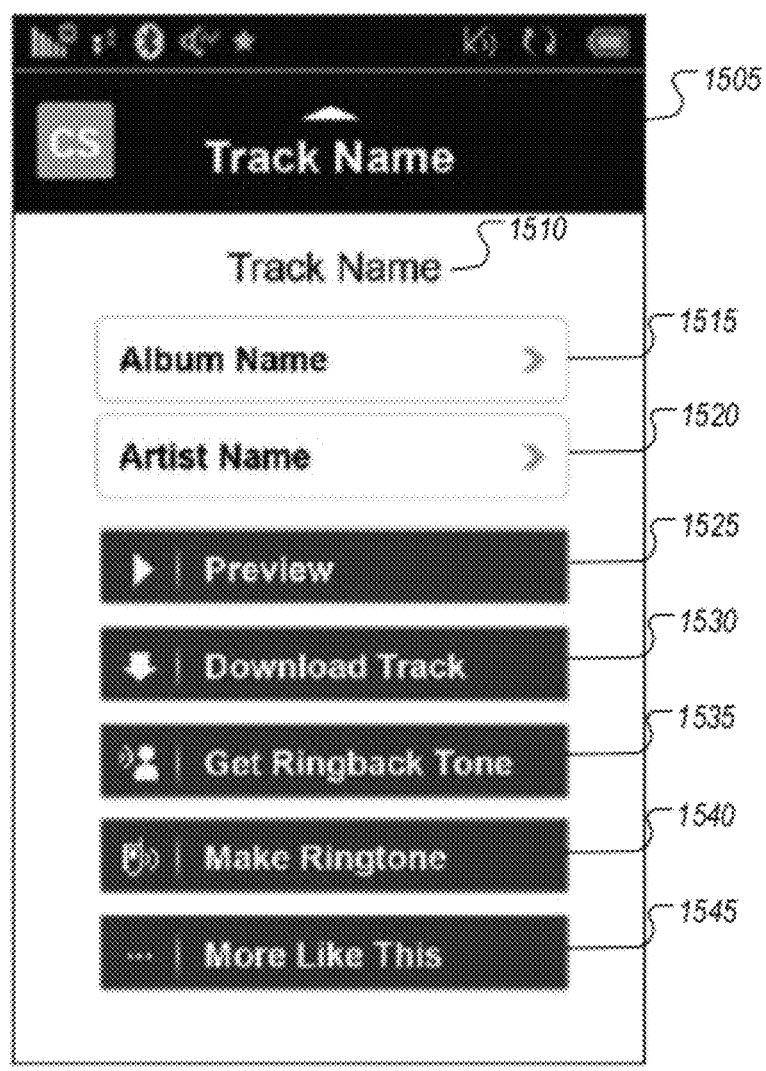
FIG. 15 shows an exemplary interface for performing functions relating to a media item in the unlimited media system.

FIG. 15 shows an exemplary interface for performing functions relating to a media item in the unlimited media system. The media item interface 1505 can correspond to a single item of media content, e.g. a music track. A media item identifier 1510 can be presented in the media item interface 1505, which uniquely describes the media item. For instance, a track can be identified by its full title, including any or all of artist, album, and performance. Additionally, menu options can be included to permit accessing relating media content. For instance, a media collection button 1515, e.g. identified by album name, can be included. The media collection button 1515 can be selected to show other items of media content from the same collection, such as additional tracks on the same album. Also, an artist button 1520 can be included to permit accessing other media content by the same artist. In some implementations, only media content created by that artist can be presented. In some other implementations, media content created by a group that included the identified artist also can be presented.

Further, options for one or more functions associated with the item of media content also can be presented. For instance, a preview button 1525 can be selected to access a preview of the item of media content, such as a 30 second sample of the track. Also, a download button 1530 can be selected to request downloading of the full item of media content to the subscriber's device. A get ringback tone button 1535 can be selected to retrieve a ringback tone that is based on the item of media content. For instance, a ringback tone generated from a portion of a music track can be retrieved. A make ringtone button 1540 also can be selected to permit the subscriber to create a ring tone based on the item of media content. For instance, selecting the make ringtone button 1540 can cause a ring tone creation interface to be presented, in which a subscriber can identify a portion of a music track to use as a ring tone. The subscriber can specify a starting point for the ring tone in the item of media content, e.g., along a media time scale. The subscriber also can define the extent of the ring tone by specifying an ending point or a duration. In some implementations, a default duration can be used if an end point or duration is not specified by the subscriber. Further, the ring tone can be previewed and either accepted or edited further. A make ringback tone button (not shown) can be included in addition to or in place of the make ringtone button 1540, which can be selected to make a ringback tone based on the item of media content. Ringback tone creation can be implemented in the same or a similar manner to that used to create a ring tone. Additionally, a more like this button 1545 can be included to request the system to identify or recommend similar items of media content.

Figure 16:
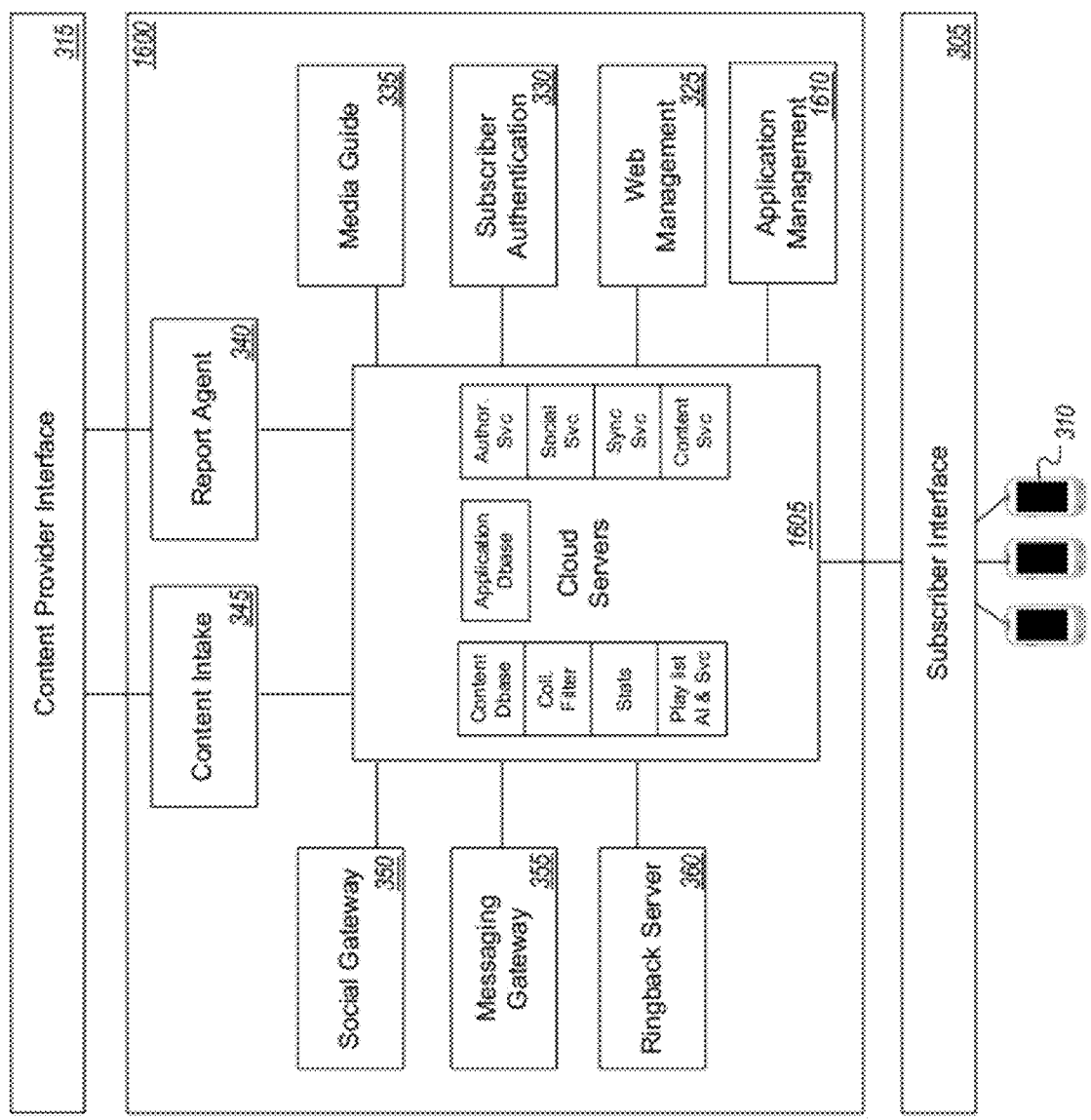
FIG. 16 shows an exemplary server configuration for providing unlimited access to content, including either or both of media and applications.

FIG. 16 shows an exemplary server configuration for providing unlimited access to content. In addition to the previously described media content, e.g. with respect to the server configuration of FIG. 3, the server configuration of FIG. 16 can provide access to applications. In some implementations, access to applications can be provided in conjunction with access to media content. For instance, access to media content and applications can be made available through a single, fixed-price subscription, e.g. a monthly subscription. The access can be unlimited, or can be limited based on one or more factors, such as a number of applications, a number of media content items, bandwidth usage, storage space on a local device, and any other such criteria. Further, the fixed-price subscription can include access to one or more communications services, such as unlimited nationwide calling, unlimited nationwide text, unlimited international calling, unlimited international text, unlimited picture and/or video messaging, unlimited data access (e.g., web access), unlimited electronic mail, unlimited streaming video (e.g., conferencing) and unlimited data backup. Alternatively, limits (e.g., volume or bandwidth limits) can be placed on one or more of the communications services. Additionally, media content can include one or more of audio (e.g., music tracks), video (e.g., television programs, music videos, movies, shorts, web casts, etc.), text-based content (e.g., e-books), ringtones, and ringback tones.

In some other implementations, access to applications can be provided separately from access to media content. For instance, access to applications can be provided as a separate subscription option. In some implementations, a separate subscription providing access to applications also can provide access to one or more communications services, which can be limited or unlimited, including one or more of nationwide calling, nationwide text, international calling, international text, picture and/or video messaging, data access (e.g., web access), electronic mail, streaming video (e.g., conferencing) and data backup. In other implementations, the separate subscription can be paired with one or more other subscriptions to communications and/or media services, e.g. in an a la carte plan.

Additionally, applications can be divided into separate categories, e.g. based on one or more factors, such as functionality, cost, provider, etc. Access to applications, such as through a subscription, further can be limited based on an association of applications with a category. For instance, the applications can be divided among categories including, basic applications (e.g., note utilities, calculators, calendars, clocks, etc.), free applications, social-networking applications (e.g., applications associated with third-party social networking sites, chat applications, messaging applications, video conferencing applications, etc.), gaming applications, e-commerce applications, and any other such categories. In some implementations, access to applications can vary based on the type of subscription, such that access is granted only to certain application categories and/or that a level of access to some application categories is greater than a level of access to others. For instance, under a particular subscription, access to one or more application categories can be unlimited, while access to one or more other application categories can be limited or restricted. By way of example, a monthly subscription can be offered that provides unlimited access to free applications and limited (e.g., based on volume or usage) access to gaming applications. Verification and authorization can be required to access applications through the server environment 1600, and can be performed in the same or a similar manner as verification and authorization performed for access to media content.

Server environment 1600 can be implemented using a collection of servers, e.g. configured to provide the appearance of a single device. Unless otherwise noted, the server configuration of FIG. 16 can be the same as or similar to that described with respect to FIG. 3. The collection of servers can be scaled to correspond to demand.

The collection of servers can include one or more core servers 1605 (or "the cloud") configured to provide services relating to the provision of either or both of media content and applications. Additionally, the collection of servers can include one or more secondary servers, e.g. application management server 1610, configured to provide additional functionality. In some other implementations, all of the functionality of server environment 1600 can be resident in the core servers 1605. The servers included in server environment 1600 can be co-located or distributed, and can communicate over dedicated connections and/or networked connections, including public and private networks.

The collection of core servers 1605 (or "Cloud" or "the Cloud") can provide access to either or both of media content and applications for subscribers 310. For instance, the core servers 1605 can have an application database that includes the applications available for download by subscribers. The applications can include any and all applications configurable to be loaded and executed on a subscriber's device 310. In some implementations, all of the available applications in the application database can be made available as a single collection. In such implementations, a subscriber permitted to access applications within the server environment 1600 can be provided with access to all applications. In some other implementations, the applications available in the application database can be organized in categories, such as gaming applications and e-commerce applications. As a result, access to applications available in the application database can be controlled based on individual categories or category groupings. Further, access to applications in the application database can be unlimited or limited. For instance, a subscriber with unlimited access to applications can be permitted to download, install, and use as many applications as desired from the application database, e.g., for the subscription period. When access rights are terminated, e.g. upon expiration of a subscription, the subscriber's ability to use installed applications and to download new applications can be terminated.

If access to applications is limited, the subscriber's ability to download, install, and use applications can be restricted in accordance with the limitations. For instance, a subscriber may be permitted to download a limited number of applications in a particular period or may be restricted as to how much one or more applications can be used within a period. Any combination of limitations can be imposed, and limitations can be imposed at any level, including the subscriber account level, the application category level, and the individual application level. The applications available in the application database can be received through the content intake server 345.

Additionally, an application management server 1610 can be configured to perform one or more management functions associated with applications included in the application database. For instance, the application management server 1610 can be configured to track one or more statistics associated with the applications, such as download and usage statistics. The assignment of applications to categories also can be performed in conjunction with the application management server 1610. Additionally, the enforcement of access policies and limitations with respect to one or more applications also can be performed, at least in part, by the application management server 1610. In other implementations, the application management server 1610 can be omitted and the functionality can be performed by the core servers 1605, including authorizations services, statistics, and collaborative filtering.

Figure 17:
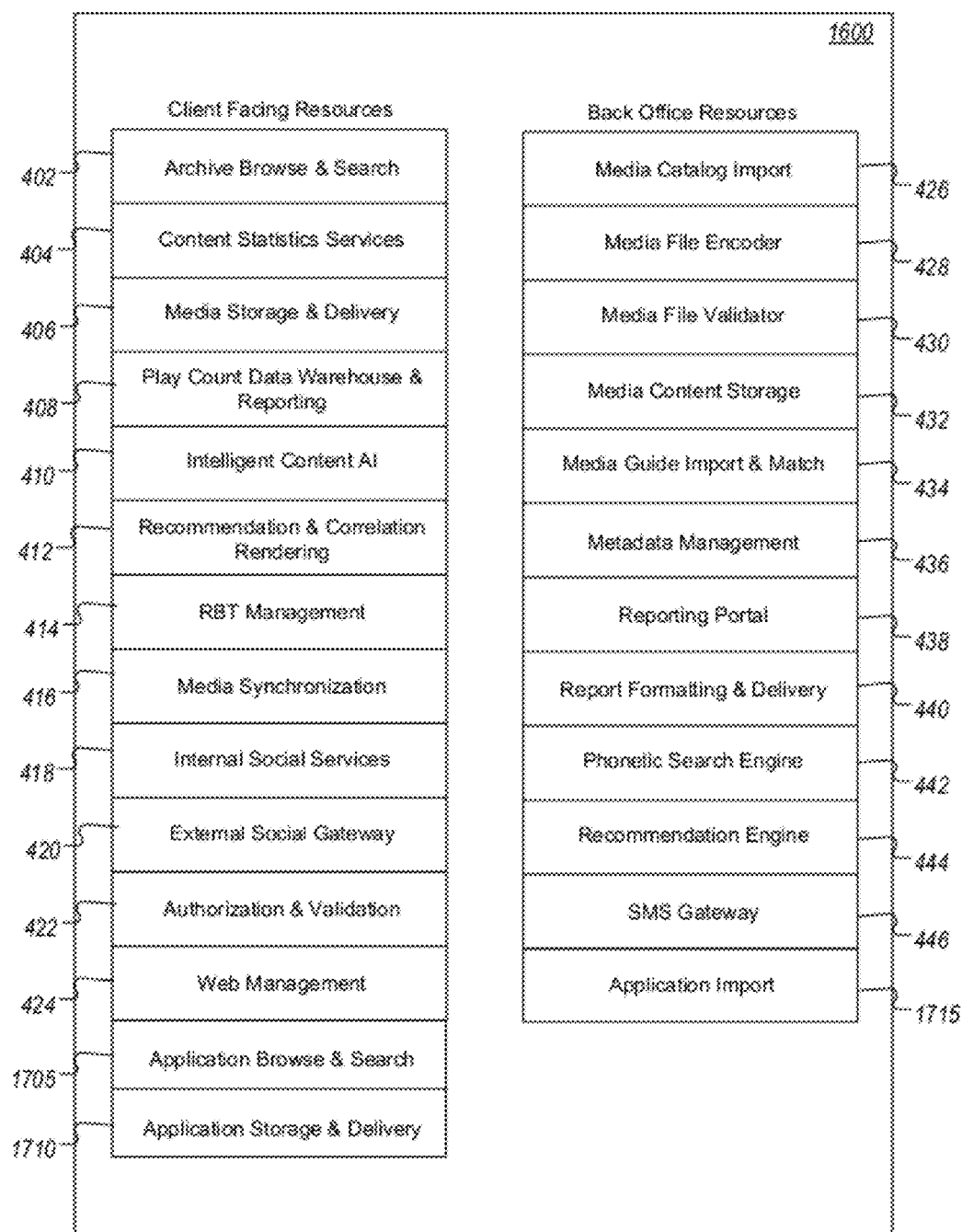
FIG. 17 shows an exemplary configuration of modules included in a media server environment configured to provide unlimited access to either or both of media and applications.

FIG. 17 shows an exemplary configuration of modules included in a media server environment configured to provide unlimited access to either or both of media and applications. The server environment of FIG. 16 can incorporate multiple modules, which can be implemented in the various included servers. The modules can be client facing resources, which provide services that are accessible to subscribers, or back office facing resources, which provide support and management functionality. In some implementations, additional, fewer, or different modules can be included. Unless otherwise noted, the modules can be the same as or similar to those described with respect to FIG. 4.

An application browse and search module 1705 can provide catalog browsing and searching services for one or more application catalogs (or application databases) accessible through the server environment 1600. The application browse and search module 1705 can present available applications through direct lookup, e.g. through title, category, ranking, or other variable, and through search, e.g. for applications that are responsive to one or more search terms. For instance, a subscriber can request to view all applications that correspond to a particular function, e.g. card games or banking, and can be presented with one or more pages that present the corresponding applications. Further, the application browse and search module 1705, alone or in combination with one or more other modules, can render results in a predetermined format, e.g. XML, that can be transferred to a corresponding mobile communications device using compression, e.g. HTTP compression (HTTPC). Also, the results can be streamed to the mobile communications device, e.g. using a Simple API for XML (SAX) parser, to permit search results to be rendered progressively.

Application storage and delivery module 1710 can be configured to provide subscribers with access to applications. Access can be restricted to authenticated subscribers who have either a current or active subscription to a service that includes applications. For instance, application storage and delivery module 1710 can communicate with authorization and validation module 422 to confirm that a subscriber is permitted to access the application database, a particular application, or an application category. Further, application storage and delivery module 1710 can transfer a requested application to a mobile communications device using a secure connection, e.g. over-the-air transmission using an HTTPS connection. Additionally, delivery of an application can be performed by progressive download, e.g. using HTTP 1.1, to permit downloading to be paused and resumed.

The back office resources can include an application import module 1715 that imports applications from third-party partners, e.g. application developers, into the server environment 1600. The applications can be imported in any format, including as installation packages that can be installed over the air or downloaded and installed on a mobile device. A change list can be generated in conjunction with each new application received, e.g. so that an application listing can be updated. The application import module 1715 also can be configured to validate each new application file that is received, and to flag any application file that fails the validation. An application that is received and validated can be stored in the application database and made available to subscribers for installation.

The disclosed techniques for providing subscribers with unlimited access to media content may be implemented using one or more computer programs comprising computer executable code stored on a tangible computer readable medium and executing on the data processing device or system. The computer readable medium may include a hard disk drive, a flash memory device, a random access memory device such as DRAM and SDRAM, removable storage medium such as CD-ROM and DVD-ROM, a tape, a floppy disk, a Compact Flash memory card, a secure digital (SD) memory card, or some other storage device. In some implementations, the computer executable code may include multiple portions or modules, with each portion designed to perform a specific function described in one or more figures. In some implementations, the techniques may be implemented using hardware such as a microprocessor, a microcontroller, an embedded microcontroller with internal memory, or an erasable, programmable read only memory (EPROM) encoding computer executable instructions for performing the disclosed techniques. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory, a random access memory, or both. The elements of a computer include a processor for executing instructions and one or more memory devices for storing instructions and data. Generally, a computer will also include, or be operatively coupled to receive data from or transfer data to, or both, one or more mass storage devices for storing data, e.g., magnetic disks, magneto-optical disks, and optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

To provide for interaction with a user, the systems, apparatus, and techniques described here can be implemented on a data processing device having a display device (e.g., an LED (light emitting diode) or LCD (liquid crystal display) monitor) for displaying information to the user and a positional input device, such as a keyboard and a pointing device (e.g., a touch screen, mouse, or trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specifics, these should not be construed as limitations on the scope of any innovation or of what may be claimed, but rather as descriptions of features that may be specific to particular embodiments of particular innovations. Certain features that are described in this specification in the context of separate embodiments also can be implemented in combination in a single embodiment. Conversely, various features that are described in the context of a single embodiment also can be implemented in multiple embodiments, either separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application, including in the attached appendix.

What is claimed is:

1. A computer-implemented method of providing access to media content, the method comprising:
   receiving a request to access a media server environment from a mobile communications device;
   identifying a subscriber account associated with the mobile communications device;
   determining that the subscriber account is current and authorized to access the media server environment; and
   providing authorization to access the media server environment and authorization to access a removable secure storage location on the mobile communications device based, at least in part, on the subscriber account, the removable secure storage location maintaining media content transmitted to the mobile communications device from the media server environment based on valid subscriber account information.

2. The computer-implemented method of claim 1, further comprising:
   sending an access denial message when determining that the subscriber account is not current, or not authorized or both.

3. The computer-implemented method of claim 2, wherein the access denial message includes one or more reasons for denying access.

4. The computer-implemented method of claim 1, further comprising:
   determining whether the request to access the media server environment comprises a request to access only local content or local application on the mobile communications device.

5. The computer-implemented method of claim 1, further comprises:
   when determining that the subscriber account is current and authorized to access the media server environment, automatically providing access to the media content stored on the mobile communications device.

6. The method computer-implemented of claim 1, wherein providing authorization to access the secure storage location on the mobile communications device includes providing authorization to local content maintained on the secure storage location for a predetermined period of time.

7. The computer-implemented method of claim 6, wherein the predetermined period of time comprises a pre-paid period.

8. The computer-implemented method of claim 1, wherein providing authorization to access the media server environment and to access the removable secure storage location on the mobile communications device comprises: providing unlimited use access.

9. The computer-implemented method of claim 1, further comprising:
   when determining that the subscriber account is current and authorized to access the media server environment, displaying a user interface corresponding to the media server environment.

10. The computer-implemented method of claim 9, further comprising:
    transferring one or more updates associated with media content stored on the mobile communications device to the mobile communications device.

11. The computer-implemented method of claim 1, further comprising preventing access to a software application that accesses the secure storage location responsive to a determination that the subscriber account is not current or authorized.

12. A media content distribution system comprising:
    a media server environment comprising one or more servers configured to communicate over a wireless telecommunications network and to tangibly store media content, the media server environment including processor electronics configured to perform operations comprising:
    receiving an access request from a mobile communications device, the mobile communications device configured to communicate over a wireless telecommunications network;
    identifying a subscriber account associated with the mobile communications device;
    determining that the subscriber account is current and authorized to access the media server environment; and
    providing authorization to access the media server environment and authorization to access a removable secure storage location on the mobile communications device based, at least in part, on the subscriber account, the removable secure storage location storing media content transmitted to the mobile communications device from the media server environment based on valid subscriber account information.

13. The media content distribution system of claim 12, wherein the media server environment comprising one or more servers is configured to send an access denial message when determining that the subscriber account is not current, or not authorized or both.

14. The media content distribution system of claim 13, wherein the access denial message includes one or more reasons for denying access.

15. The media content distribution system of claim 13, wherein the access denial message corresponds to a command to deny access to the secure storage location.

16. The media content distribution system of claim 15, wherein denying access to the secure storage location includes denying access to a software application that accesses the secure storage location responsive to a determination that the subscriber account is not current or authorized.

17. The media content distribution system of claim 12, wherein the media server environment comprising one or more servers is configured to determine whether the access request comprises a request to access only local content or local application on the mobile communications device.

18. The media content distribution system of claim 12, wherein the media server environment comprising one or more servers is configured to:
    automatically provide access to the media content stored on the mobile communications device when determining that the subscriber account is current and authorized to access the media server environment.

19. The media content distribution system of claim 12, wherein the media server environment comprising one or more servers is configured to:
    automatically provide access to the media content stored on the secure storage location on the mobile communications device when determining that the subscriber account is current and authorized to access the media server environment.

20. The media content distribution system of claim 12, wherein the media server environment comprising one or more servers is configured to provide access to local content stored on the secure storage location on the mobile communications device for a predetermined period of time.

21. The media content distribution system of claim 12, wherein the media server environment comprising one or more servers is configured to provide unlimited use access to the media server environment and to media content stored on the mobile communications device.

22. The media content distribution system of claim 12, wherein the media server environment comprising one or more servers is configured to display a user interface corresponding to the media server environment when determining that the subscriber account is current and authorized to access the media server environment.

23. The media content distribution system of claim 22, herein the media server environment comprising one or more servers is configured to transfer one or more updates associated with media content stored on the mobile communications device to the mobile communications device.

24. A non-transitory computer-readable media storing instructions configured to cause a media server to perform operations for providing access to media content, the operations comprising:
- receiving a request to access a media server environment from a mobile communications device;
- identifying a subscriber account associated with the mobile communications device;
- determining that the subscriber account is current and authorized to access the media server environment; and
- providing authorization to access the media server environment and authorization to access a removable secure storage location on the mobile communications device based, at least in part, on the subscriber account, the removable secure storage location storing media content transmitted to the mobile communications device from the media server environment based on valid subscriber account information.

* * * * *